United States Patent [19]
Kaji

[11] Patent Number: 5,526,259
[45] Date of Patent: Jun. 11, 1996

[54] METHOD AND APPARATUS FOR INPUTTING TEXT

[75] Inventor: Hiroyuki Kaji, Tama, Japan

[73] Assignee: Hitachi, Ltd., Tokyo, Japan

[21] Appl. No.: 231,901

[22] Filed: Apr. 22, 1994

Related U.S. Application Data

[63] Continuation of Ser. No. 645,553, Jan. 24, 1991, abandoned.

[30] Foreign Application Priority Data

Jan. 30, 1990 [JP] Japan .................................. 2-19654

[51] Int. Cl.$^6$ .................................................. G06F 17/28
[52] U.S. Cl. ................................ 364/419.03; 395/2.63; 395/2.86
[58] Field of Search ........................ 381/36, 41, 43, 381/44; 364/419.01, 419.02, 419.03, 419.09, 419.16, 419.07; 434/156, 157, 167, 169; 395/2.86, 2.63

[56] References Cited

U.S. PATENT DOCUMENTS

| | | | |
|---|---|---|---|
| 3,646,576 | 2/1972 | Griggs | 381/44 |
| 4,193,119 | 3/1980 | Arase et al. | 364/419 |
| 4,443,856 | 4/1984 | Hashimoto et al. | 381/51 |
| 4,507,750 | 3/1985 | Frantz et al. | 395/2.86 |
| 4,543,631 | 9/1985 | Kurosu et al. | 364/419 |
| 4,654,798 | 3/1987 | Taki et al. | 434/157 |
| 4,703,504 | 10/1987 | Vittorelli | 381/41 |
| 4,777,600 | 10/1988 | Saito et al. | 364/419 |
| 4,896,358 | 1/1990 | Bahler et al. | 381/41 |
| 4,984,177 | 1/1991 | Rondel et al. | 364/419 |
| 5,018,201 | 5/1991 | Sugawara | 381/41 |
| 5,075,896 | 12/1991 | Wilcox et al. | 381/41 |
| 5,091,950 | 2/1992 | Ahmed | 395/2.86 |
| 5,131,043 | 7/1992 | Fujii et al. | 381/43 |

FOREIGN PATENT DOCUMENTS

| | | |
|---|---|---|
| 59-3629 | 1/1984 | Japan . |
| 59-132039 | 8/1984 | Japan . |
| 59-132038 | 8/1984 | Japan . |
| 63-182735 | 7/1988 | Japan . |

OTHER PUBLICATIONS

Yutaka Ohyama, et al., "A Kana String Formation Method for Voice Input Kana-Kanji Translation," NEC Research and Development, No. 75, Oct. 1984, pp. 32–37. (Provided in English).

*Primary Examiner*—Robert A. Weinhardt
*Assistant Examiner*—Jennifer H. Dixon
*Attorney, Agent, or Firm*—Fay, Sharpe, Beall, Fagan, Minnich & McKee

[57] ABSTRACT

By inputting an input text in voice or phonogram and also the source information which is a source of the input text, extracting candidate words composing the input text by analyzing the source information, and using the candidate words, ambiguity in converting the voice or phonogram to characters is eliminated and highly accurate conversion is realized. For example, highly reliable translation is effected by extracting candidate words comprising the translation text using a bilingual dictionary containing words in the source language, translations in the target language, and extracting associated words in the target language which correspond to each other. When ambiguity occurs in converting the voice or phonogram input of the translation text to characters, by selecting the above candidate words preferentially, a voice typewriter for translation or a word processor for translation for converting the inputted translation text to characters a highly accurate translation is realized.

24 Claims, 16 Drawing Sheets

FIG. 3

| | | 2101 | 2102 | 2103 | 2104 |
|---|---|---|---|---|---|
| DEADLINE | 3 | きげん | 期限 |
| | | きじつ | 期日 |
| | | しめきり | 締切り |
| DISCUSS | 5 | ぎろん | 議論 |
| | | ろんじる | 論じる |
| | | とうろん | 討論 |
| | | けんとう | 検討 |
| | | はなしあう | 話し合う |
| ERA | 3 | じだい | 時代 |
| | | じき | 時期 |
| | | きげん | 紀元 |
| EXAMINE | 5 | ちょうさ | 調査 |
| | | けんさ | 検査 |
| | | けんとう | 検討 |
| | | しけん | 試験 |
| | | しもん | 試問 |
| EXISTING | 4 | げんそん | 現存 |
| | | げんこう | 現行 |
| | | げんざい | 現在 |
| | | いま | 今 |
| HEALTH | 3 | けんこう | 健康 |
| | | けんぜん | 健全 |
| | | えいせい | 衛生 |
| MANUSCRIPT | 2 | げんこう | 原稿 |
| | | てがき | 手書き |
| ORIGIN | 4 | きげん | 起源 |
| | | みなもと | 源 |
| | | ほったん | 発端 |
| | | うまれ | 生まれ |
| SPEECH AND ACTION | 1 | げんこう | 言行 |

FIG. 4

| | 2201 | 2202 | 2203 |
|---|---|---|---|
| | きけん | 2 | 危険 |
| | | | 棄権 |
| | きげん | 4 | 紀元 |
| | | | 起源 |
| | | | 期限 |
| | | | 機嫌 |
| | きじつ | 1 | 期日 |
| | けんこう | 2 | 健康 |
| | | | 兼行 |
| | けんとう | 3 | 検討 |
| | | | 見当 |
| | | | 健闘 |
| | げんこう | 3 | 原稿 |
| | | | 現行 |
| | | | 言行 |
| | げんとう | 2 | 厳冬 |
| | | | 幻燈 |
| | しげき | 1 | 刺激 |
| | しめきり | 1 | 締切り |
| | ていしつ | 2 | 低質 |
| | | | 低湿 |
| | ていしゅつ | 1 | 提出 |
| | てがき | 1 | 手書き |
| | に | 1 | に |
| | の | 1 | の |
| | も | 1 | も |

FIG. 7a  PHONEME SEGMENT

| SEGMENT ID | SEGMENT TYPE | PHONO-GRAM | PROBA-BILITY | LIST OF PRECEDING PHONEME SEGMENTS | LIST OF SUCCEEDING PHONEME SEGMENTS | LIST OF PRECEDING WORD SEGMENTS | LIST OF SUCCEEDING WORD SEGMENTS |
|---|---|---|---|---|---|---|---|
| 9201 | 9202 | 9203 | 9204 | 9205 | 9206 | 9207 | 9208 |

FIG. 7b  WORD SEGMENT

| SEGMENT ID | SEGMENT TYPE | CHARACTER EXPRESSION | PROBA-BILITY | LIST OF PRECEDING PHONEME SEGMENTS | LIST OF SUCCEEDING PHONEME SEGMENTS | LIST OF PRECEDING WORD SEGMENTS | LIST OF SUCCEEDING WORD SEGMENTS | ID FOR WORD SEGMENT GROUP |
|---|---|---|---|---|---|---|---|---|
| 9211 | 9212 | 9213 | 9214 | 9215 | 9216 | 9217 | 9218 | 9219 |

(1) SOURCE TEXT : DEADLINE FOR MANUSCRIPTS
(2) DICTATED TRANSLATION TEXT : げんこうのしめきり
(3) OUTPUT OF THE PHONEME RECOGNITION FUNCTION (PHONEME LATTICE) :

(4) CRT DISPLAY OF THE CONVERTED RESULT :

原稿の締切り

(NOTE) ／／／ REVERSE DISPLAY (MEANS THAT THERE IS NEXT CANDIDATE)

(1) SOURCE TEXT : DEADLINE FOR MANUSCRIPTS
(2) KANA INPUT TRANSLATION TEXT : げんこうのていしゅつきげん
(3) USER'S INPUT AND CRT DISPLAY

|  | (USER'S INPUT) | (CRT DISPLAY) |
|---|---|---|
| (0) |  | ▨ |
| (1) | げ | げ▨ |
| (2) | ん | げん▨ |
| (3) | こ | げんこ▨ |
| (4) | う | げんこう▨ |
|  |  | 原稿▨ |
| (5) | の | 原稿の▨ |
| (6) | て | 原稿のて▨ |
| (7) | い | 原稿のてい▨ |
| (8) | し | 原稿のていしゅ▨ |
| (9) | つ | 原稿のていしゅつ▨ |
| (10) | き | 原稿のていしゅつき▨ |
| (11) | げ | 原稿のていしゅつきげ▨ |
| (12) | ん | 原稿のていしゅつきげん▨ |
|  |  | 原稿の提出期限▨ |

METHOD AND APPARATUS FOR INPUTTING TEXT

This is a continuation of U.S. application Ser. No. 07/645,553 filed Jan. 24, 1991, abandoned.

BACKGROUND OF THE INVENTION

1. Field of the Invention

The present invention relates to a method and an apparatus for inputting a text, particularly a voice typewriter for converting voice directly to characters and a word processor for converting kana (Japanese phonograms) or romaji (Japanese phonograms expressed in alphabetic text) to kanji (Japanese ideograms) and kana.

2. Description of the Prior Art

An efficient method for inputting a text to a computer or a word processor is possibly to input voice. It is certainly most efficient if inputted voice is converted to characters.

However, no practical voice typewriter has been on the market due to difficulties in voice recognition. In a voice input word processor, for example, indicated in Japanese Patent Application Laid-Open No. 63-182735, voice is inputted in units of character string in place of keyboard entry, candidate words are displayed on the screen, and the final selection is performed by the operator. This method intends to greatly decrease the time for keyboard entry and to speed up text input. However, it is a role of the operator to eliminate the ambiguity of voice recognition and the step of final selection takes time.

The keyboard entry method is already made practicable. There are some methods for inputting a Japanese text containing a very large amount of kanji, such as a method for inputting kana from the keyboard, a method for inputting romaji from the keyboard, and a two-stroke method, which is a special one, for inputting a code containing two kana characters and a numeral whereto kanji is assigned. Although the two-stroke method allows for high speed input, it imposes problems such that it takes a lot of time to store a code corresponding to kanji and it takes a lot of time to look up and input a code for each character. Since the kana or romaji input method requires writing texts with a space between words and it is a role of the operator to select a correct word from a homophone, it is not an efficient method.

In a conventional voice typewriter, therefore, it is required to eliminate the ambiguity of voice recognition by the operator, resulting in a lot of time. In the kana or romaji input method from the keyboard, it is a role of the operator to select a correct word from a homophone, and it is not an efficient method.

SUMMARY OF THE INVENTION

The first object of the present invention is to solve said problems of the prior art on inputting a translation text (a text created by translating a source text), abstract text (a text obtained by abstracting a text), or comment text (a natural language text expressing information interpreting an image or data) for images or data, that is, to provide a method and an apparatus for inputting a text whereby the translation text, abstract text, or comment text for images or data can be converted to characters highly precisely by voice input or phonogram input of such a text.

The second object of the present invention is to provide a character recognition apparatus with voice input function for correcting an error in character recognition by voice input of read characters or words.

To accomplish the above objects, the method and apparatus for inputting a text of the present invention are characterized in that candidate words composing the above text to be inputted are extracted by analyzing the source information and the text which is inputted by the first means of expression is converted to a target text by the second means of expression using the above candidate word information. Executed word information as used here is a word likely to be included in the translation text, obtained by analyzing the source text.

The following is a concrete explanation: The method and apparatus are characterized in that (A) the source information which is a source for creation of an input text is analyzed by executing the source information analysis module, information on candidate words composing the input text is extracted, and the text which is inputted by the first means of expression is converted to a target text by the second means of expression using the above candidate word information. The method for inputting translation texts of the present invention is characterized in that (B) the source text is analyzed by executing the source text analysis module, candidate words composing the translation text are extracted, and the translation text by the first means of expression is converted to a text by the second means of expression using the above candidate word information by executing the translation text conversion module. (C) The above source text analysis module is also characterized in that candidate words composing the translation text are extracted from the words composing the source text by using a bilingual dictionary containing words in the source language, equivalents in the target language, and associated words in the target language which correspond to each other, and the above translation text conversion module is characterized in that if ambiguity occurs when the first means of expression is changed to the second means of expression, the above ambiguity is eliminated by selecting the candidate words, which are extracted by the above source text analysis module, preferentially basis. The voice typewriter for inputting a translation text of the present invention is characterized in that (D) a source text analysis module for recognizing the words composing the source text and extracting candidate words composing the translation text, a phoneme recognition module for converting the translation text which is inputted in voice to one or more phonogram strings whose probability (plausibility of the recognition) is more than a predetermined value, and a phoneme to character conversion module for retrieving the segment of the phonogram strings converted by the phoneme recognition module which coincides with the phonetic expression of one of the candidate words extracted by the above source text analysis module and converting the phonogram strings in the coincident segment to the character expression of the coincident words are provided.

The word processor for inputting a translation text of the present invention is characterized in that (E) a source text analysis module for recognizing the words composing the source text and extracting candidate words composing the translation text and a phoneme to character conversion module for retrieving the segment of the translation text inputted in kana or romaji which coincides with the kana or romaji expression of one of the words extracted by the above source text analysis module and converting the coincident segment to the character expression of the coincident word are provided.

The translation text inputting apparatus (voice typewriter or word processor) of the present invention is characterized in that (F) a source text display module for displaying all or a part of the above source text on a display apparatus is provided, the above source text analysis module analyzes the part of the source text which is displayed on the above display apparatus, to extract candidate words comprising the translation text and the above phoneme to character conversion module converts the translation text from the first means of expression to the second means of expression using candidate information which is extracted by analyzing the displayed part. The translation text inputting apparatus of the present invention is also characterized in float (G) the above source text display module displays a part of the source text in a format which is different from that of another part, the above source text analysis module analyzes the part of the source text which is displayed in a format which is different from that of another part, to extract candidate words comprising the translation text and the above phoneme to character conversion module converts the translation text from the first means of expression to the second means of expression using candidate word information which is extracted by analyzing the part which is displayed in a format which is different from that of another part, The translation text inputting apparatus of the present invention is also characterized in that (H) having a module for judging whether inputting and conversion processing for the translation text part which is displayed on the above display apparatus or a part displayed in a format different from that of other parts, and when the processing is finished displays the next part of the translation text on the above display apparatus or displays it in a format different from that of another part. The translation text inputting apparatus of the present invention is also characterized in that (I) a candidate word display module for displaying the candidate words extracted by the above source text analysis module on the display apparatus is provided. The translation text inputting apparatus of the present invention is also characterized in that (J) a translation text display module for displaying the translation text by the second means of expression which is an output of the above phoneme to character conversion module on the display apparatus is provided.

The translation text editing apparatus of the present invention is characterized in that (K) a source text analysis module for analyzing the source text and extracting information on candidate words composing the corrected text which is to be inputted for correction and a corrected text conversion module for converting the corrected text which is to be inputted in voice or phonograms to characters using the candidate word information extracted by the source text analysis module are provided. The abstract text inputting apparatus of the present invention is characterized in that (L) a source text analysis module for analyzing the source text and extracting information on candidate words composing the abstract text and an abstract text conversion module for converting the abstract text which is to be inputted in voice or phonograms to characters using the candidate word information extracted by the source text analysis module are provided.

The image or data comment text inputting apparatus of the present invention is characterized in that (M) a source image/data analysis module for analyzing the source images or data and extracting information on candidate words composing the comment text for those images or data and a comment text conversion module for converting the comment text which is to be inputted in voice or phonograms to characters using the candidate word information extracted by the source image/data analysis module are provided.

The character recognition apparatus with voice input function of the present invention is characterized in that (N) a character recognition module for outputting one or more solutions whose probability is a fixed value or more, a voice recognition module for outputting one or more solutions whose probability is a fixed value or more, and a most probable solution selection module for selecting characters contained in both outputs of the character recognition module and the voice recognition module preferentially are provided.

The voice typewriter for simultaneous translation of the present invention is characterized in that (0) a first and a second voice recognition module for outputting one or more solutions whose probability is a fixed value or more and a most probable solution selection module for selecting, when the output of the first voice recognition module and the output of the second voice recognition module contain sets of words having a translation relation, those word sets preferentially are provided.

By doing this, the apparatus of the present invention inputs an input text in voice or phonograms and also the source information which is a source for the input text, analyzes the source information, and extracts information on candidate words composing the input text. The apparatus eliminates the ambiguity in conversion of voice or phonograms to characters using the candidate word information and realizes highly precise conversion.

In the voice typewriter or word processor for inputting a translation text of the present invention, a source text analysis module for analyzing a bilingual dictionary containing words in the source language, equivalents in the target language, and associated words in the target language which correspond to each other and the source text, recognizing the words composing the source text, and extracting candidate words composing the translation text with reference to the bilingual dictionary is provided. Furthermore, a translation text conversion module for selecting the words candidate extracted by the source text analysis module preferentially when ambiguity occurs in conversion of voice or phonograms of the translation text to characters is provided. By doing this, the translation text which is to be inputted in voice or phonograms can be converted to characters highly precisely.

The foregoing and other objects, advantages, manner of operation and novel features of the present invention will be understood from the following detailed description when read in connection with the accompanying drawings.

BRIEF DESCRIPTION OF THE DRAWINGS

FIG. 3 is an illustration showing a recording example of the bilingual dictionary shown in FIG. 1, FIG. 4 is an illustration showing a recording example of the target language dictionary shown in FIG. 1, FIG. 6 is an illustration showing a set of candidate words composing the translation text shown in FIG. 1, FIGS. 7(*a*) and 7(*b*) are illustrations showing the data structure of the lattice components shown in FIG. 1.

DETAILED DESCRIPTION OF THE PREFERRED EMBODIMENTS

Next, the embodiments of the present invention will be described hereunder in detail with reference to the accompanying drawings.

First, a voice typewriter for translation as a first embodiment, a kana to kanji conversion type word processor for translation as a second embodiment, an apparatus for inputting fragments of a translation text so as to post-edit results of machine translation as a modification example thereof, and an apparatus for inputting the abstract of the text will be described. Next, an apparatus for inputting an image comment text and converting it to characters will be described as a third embodiment. This can be applied to a system for inputting doctor's opinion on medical images or specialist's interpretation on remote sensing images. Furthermore, a character recognition apparatus with voice input function will be described as a fourth embodiment, and a voice typewriter for simultaneous translation as a fifth embodiment.

Figure 1:
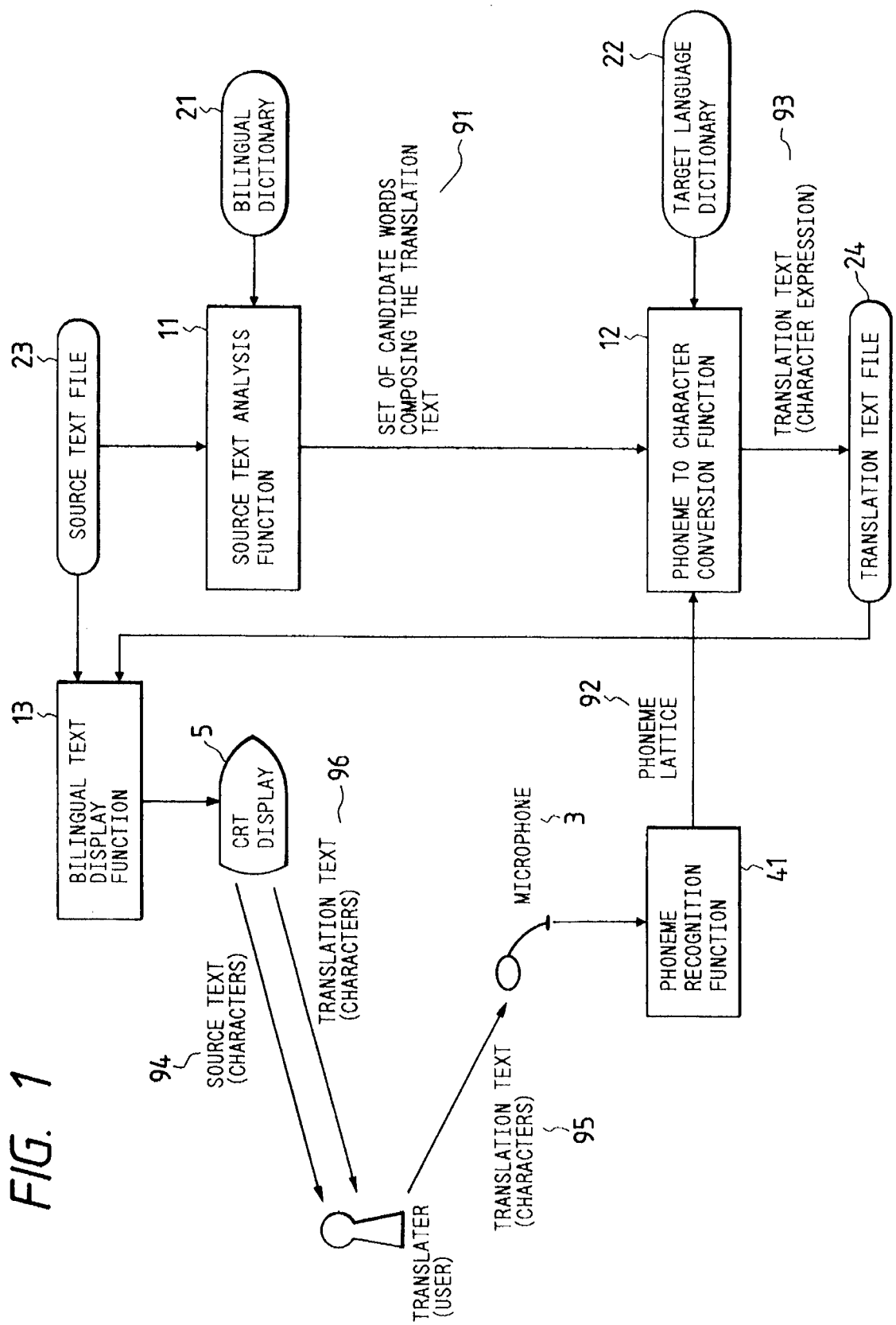
FIG. 1 is a function block diagram of a voice typewriter for translation which is a first embodiment of the present invention.
Figure 2:
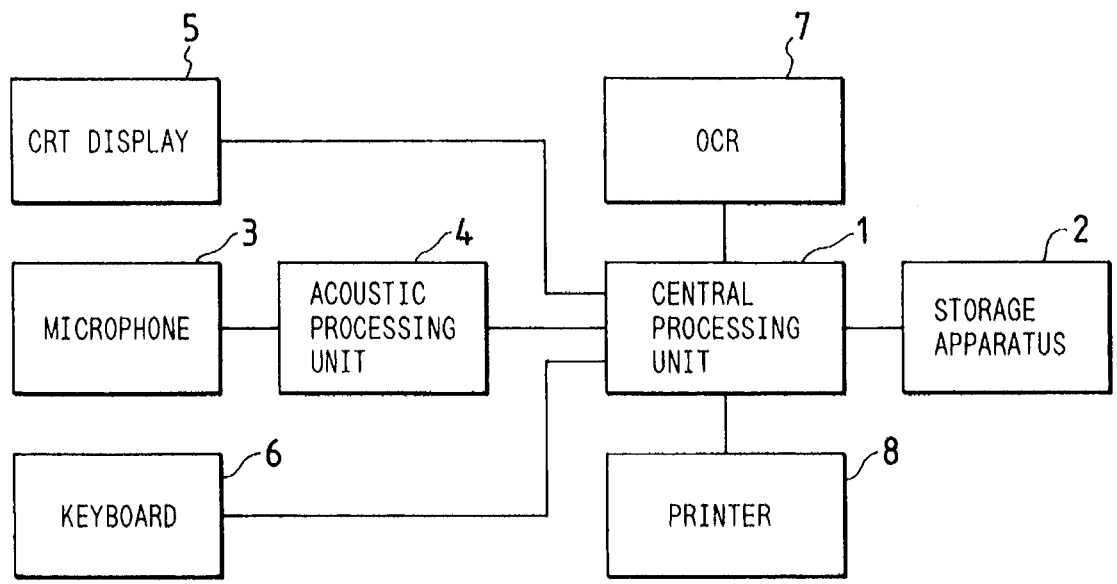
FIG. 2 is a hardware schematic view of the voice typewriter for translation shown in FIG. 1.

FIG. 1 is a function block diagram of a voice typewriter for translation which is a first embodiment of the present invention and FIG. 2 is a hardware schematic view thereof.

The function configuration for realizing the voice typewriter of this embodiment is as shown in FIG. 1.

The voice typewriter comprises a bilingual text display function 13 for displaying the source text for reference by an operator, a source text analysis function 11 for analyzing the source text, a phoneme recognition function 41 for converting voice of a dictating operator to a phonogram string, a phoneme to character conversion function 12 for converting a phonogram string to a character string, and a source text file 23, a bilingual dictionary 21, a target language dictionary 22, and a translation text file 24 which accompany the above functions.

The hardware for performing those functions comprises a central processing unit 1, a storage apparatus 2, a microphone 3, an acoustic processing unit 4, a CRT display 5, a keyboard 6, an OCR (optical character reader) 7, and a printer 8. The source text analysis function 11, the phoneme to character conversion function 12, and the bilingual text display function 13 shown in FIG. 1 are all program modules and executed by the central processing unit 1 shown in FIG. 2. The phoneme recognition function 41 shown in FIG. 1 is executed by the acoustic processing unit 4 shown in FIG. 2. The bilingual dictionary 21, the target language dictionary 22, the source text file 23, and the translation text file 24 are all stored in the storage apparatus 2 shown in FIG. 2.

Next, the actions of the bilingual dictionary 21, the source text analysis function 11, and the translation text conversion function (a function of the phoneme recognition function 41 and the phoneme to character conversion function 12 which are combined) will be described.

The bilingual dictionary 21 is a dictionary which basically contains translations in the target language for entry words in the source language, and collects all translations so as to accomplish the objects of the present invention. Each record of the bilingual dictionary 21 contains not only the translations for the word entry but also words which may be used in the translation text when the word entry occurs in the source text.

The source text analysis function 11 morphologically analyzes the source text so as to recognize words composing the source text, retrieves the bilingual dictionary 21 using the words composing the source text as a key, and obtains a set of words in the target language corresponding to the words composing the source text. The bilingual dictionary 21 contains, as mentioned above, a wide range of words in the target language related to entry words. Therefore, regardless of the type of translation text created by an operator, it is expected that the set of words obtained by the source text analysis function 11 which are likely to compose the translation text. The set of words is called a set of candidate words composing the translation text 91.

The phoneme recognition function 41 analyzes the voice waveform so as to segment and extract feature parameters and labels each segment with a phonogram such as a phonetic symbol. Ambiguity generally occurs in segmentation and phonogram labeling. Therefore, the phoneme recognition function 41 allocates a plurality of phonograms and a probability to each segment and outputs a lattice type (a set of a plurality of phonogram strings) solution to the entire text. The phoneme recognition function 41 may be realized by the art described in, for example, "Pattern Comprehension" by Yoshiaki Shirai (OHM, 1987).

The phoneme to character conversion function 12 retrieves a part of the phonogram strings contained in the lattice which can be converted to a word and repeats the processing for replacing the part with the word so as to obtain a character expression of the translation text. The processing roughly comprises two phases.

In the first phase, when a part which coincides with the phonetic expression of a word contained in the set of candidate words composing the translation text 91 which is an output of the source text analysis function 11 is found, [page 18] the phoneme to character conversion function 12 recognizes the part as a word. Since words contained in the set of candidate words composing the translation text 91 are closely related to words composing the source text, they are selected even if the probabilities (plausibilities) are acoustically low.

In the second phase, the segment in the range of the set of candidate words composing the translation text 91 which cannot be converted to words is processed. The phoneme to character conversion function 12 retrieves a part which coincides with the phonetic expression of a word in the phonogram strings in the segment which cannot be converted to the word in the first phase with the range of candidate words spread to the entire vocabulary in the target language, and recognizes the coincident part as a word. When a segment can be converted to a plurality of word strings, a word string comprising a smaller number of words is selected. The probability of a word is calculated on the basis of the probability of the phonogram, and words with a higher probability are selected in a priority basis. If a segment wherein any part does not coincide with the phonetic expression of any word is found, the phonogram is left as it is.

Next, the operation of the voice typewriter for translation which is viewed from the operator will be described hereunder.

First, the source text is stored in the source text file 23 via the OCR 7.

The processing unit of the voice typewriter is a text. When the operator instructs to start dictating a translation from the keyboard 6, the bilingual text display function 13 reads a text from the source text file 23 and displays it in the source text display area of the CRT display 5. The source text analysis function 11 executes the foregoing processing and obtains a set of candidate words composing the translation text 91.

When the operator refers to the source text 94 displayed on the CRT display 5, translates it, and dictates the translation text 95, the microphone 3 converts the voice to an electric signal. The phoneme recognition function 41 which receives the electric signal and then the phoneme to character conversion function 12 execute the foregoing processing so as to obtain the character expression 93 of the translation text and store it in the translation text file 24.

When the translation text is stored in the translation text file 24, the bilingual text display function 13 displays the translation text 96 in the translation text area of the CRT display 5. The operator looks up the screen so as to check whether the translation text is correctly converted to characters. When an error is found, the operator requests to display the next candidate or instructs reinput from the keyboard 6. In the case of reinput, the apparatus enters the voice input standby state with the display of the source text left unchanged. Therefore, the operator produces and inputs a voice more carefully than before. When the voice is correctly converted to characters, the operator is notified that the next text is to be translated from the keyboard 6. Then, the bilingual text display function 13 displays the next text in the source text display area of the CRT display 5. The subsequent processing is the same as that for the previous text. The translation text stored in the translation text file 24 is printed by the printer 8.

FIG. 3 is an illustration showing an example of the record structure and contents of the bilingual dictionary shown in FIG. 1.

In this example, the source language is English and the target language is Japanese. In the record of the bilingual dictionary 21, the source language is an entry word 2101 and the target language information contains a translation of the entry word and an associated word of the entry word. The target language information contains a word count 2102, a phonetic expression of each word 2103, and a character expression (a general expression of kanji and kana text) 2104. The record of the bilingual dictionary 21 can be retrieved by using the entry word 2101 as a key.

FIG. 4 is an illustration showing an example of the record structure and contents of the target language dictionary shown in FIG. 1.

The record of the target language dictionary 22 comprises a phonetic expression of the target language and a character expression (a general expression of kanji and kana text). Since a plurality of words having the same phonetic expression may exist, a phonetic expression 2201, a character expression count 2202, and character expressions in the count 2203 are stored in a phonetic expression 2201. The record of the target language dictionary 22 can be retrieved by using the phonetic expression 2201 as a key.

Figure 5:
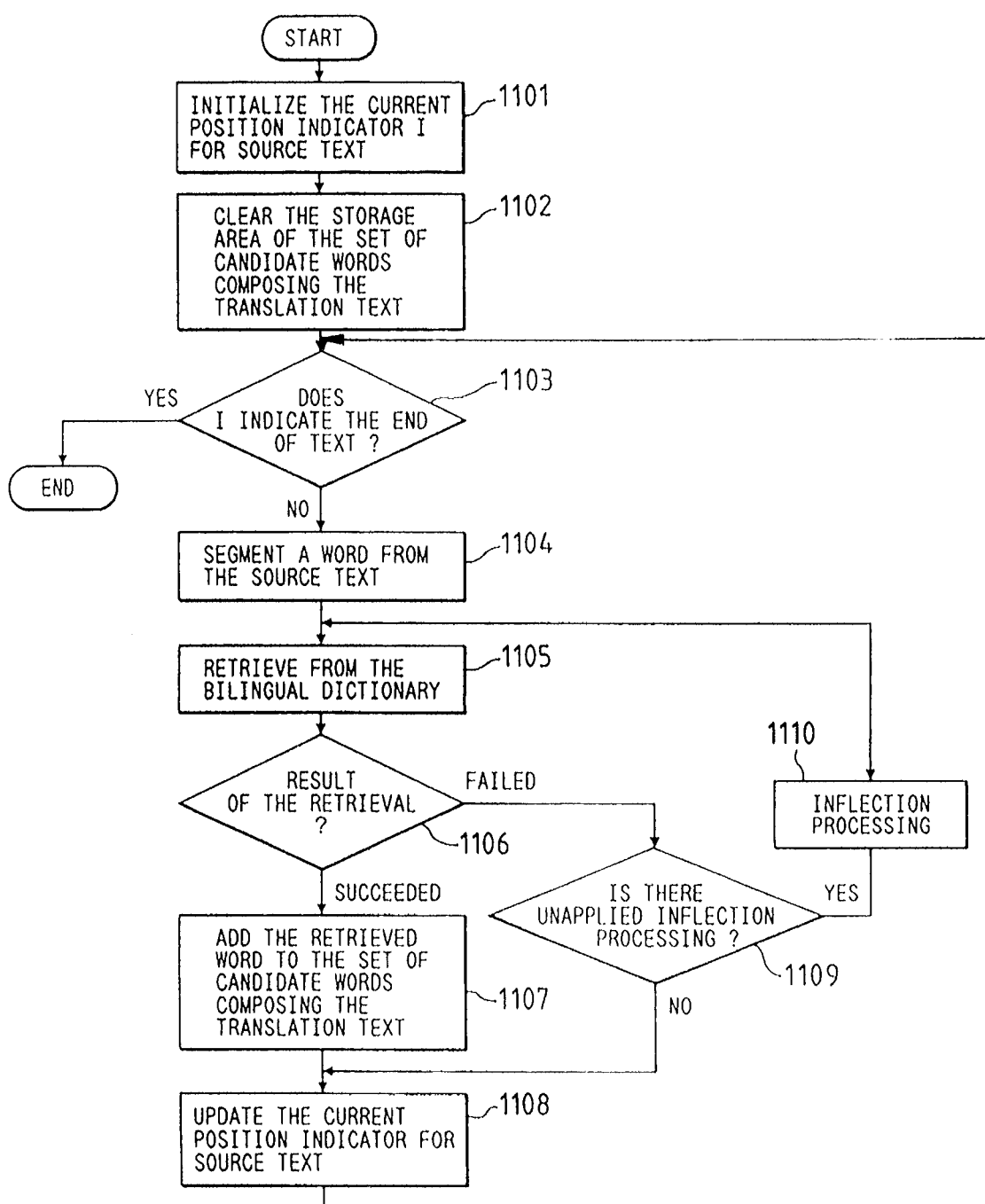
FIG. 5 is a processing flow chart of the source text analysis function shown in FIG. 1.

FIG. 5 is a processing flow chart of the source text analysis function 11 shown in FIG. 1.

When the operator instructs to start dictating a translation from the keyboard 6, the processing of a text starts. First, the current position indicator for source text for indicating the processing position in the source text is initialized so that it indicates the head of sentence (Step 1101). Next, the storage area of the set of candidate words composing the translation text 91 is cleared (Step 1102). Next, the subsequent processing (Steps 1104 to 1110) is repeated until the current position indicator for source text indicates the end of sentence (Step 1103).

First, a word is picked out or "assembled" starting at the position which is indicated by the current position indicator for source text in the source text (Step 1104), and the bilingual dictionary 21 is retrieved using the picked-out or assembled word as a key (Step 1105). When the retrieval succeeds (Step 1106), the target language information (the phonetic expression 2103 and the character expression 2104) in the retrieved record is registered in the storage area of the candidate words composing the translation text (Step 1107), the current position indicator for source text is updated so that it indicates the top position of the next word (Step 1108), the processing is returned to the word segmenting processing from the source text (Step 1104). When the retrieval of the bilingual dictionary 21 fails (Step 1106), the inflection processing is performed (Step 1110) because there are possibilities that words in the source text are inflected, and the bilingual dictionary 21 is retrieved once again (Step 1105). As inflection processing, processing corresponding to regular changes such as "s" for the plural form of a noun and "ed" for the past tense form and the past participle form of a verb is provided. When the end of a word picked out and assembled from the source text, for example, is "ed", a character string with "ed" deleted or with "d" deleted is used. Such inflection processing is applied sequentially until the retrieval of the bilingual dictionary 21 succeeds. When the retrieval fails regardless of the inflection processing type (Step 1109), the current position indicator for source text is updated (Step 1108) on the assumption that candidate word composing the translation text cannot be extracted from the word.

FIG. 6 is an illustration showing an example of a set of candidate words composing the translation text shown in FIG. 1.

The set of candidate words composing the translation text 91 which is outputted from the source text analysis function 11 is, as shown in FIG. 6, a set of a phonetic expression 9101 and a character expression 9102 of the target language.

Before starting description of the phoneme to character conversion function 12, the lattice which is handled by it will be described. The lattice comprises two components, a phoneme segment and a word segment.

FIG. 7(a) shows the record format of the phoneme segment and FIG. 7(b) the record format of the word segment.

The record of a phoneme segment comprises, as shown in FIG. 7(a), a segment identification number 9201 for distinguishing the segment from other segments, a segment type 9202 for indicating that the segment is a phoneme segment, a phonogram 9203 for indicating the phonogram provided to the segment, a probability 9204 for indicating certainty of the phonogram of the segment, a list of preceding phoneme segments 9205 for indicating the segment identification number of the phoneme segment which precedes the segment, a list of succeeding phoneme segments 9206 for indicating the segment identification number of the phoneme segment which succeeds the segment, a list of preceding word segments 9207 for indicating the segment identification number of the word segment which precedes the segment, and a list of succeeding word segments 9208 for indicating the segment identification number of the word segment which succeeds the segment.

The phoneme segments are generated as a result of recognition of the phoneme recognition function 41. Values of the items other than the list of preceding word segments 9207 and the list of succeeding word segments 9208 are set by the phoneme recognition function 41.

Figure 10:
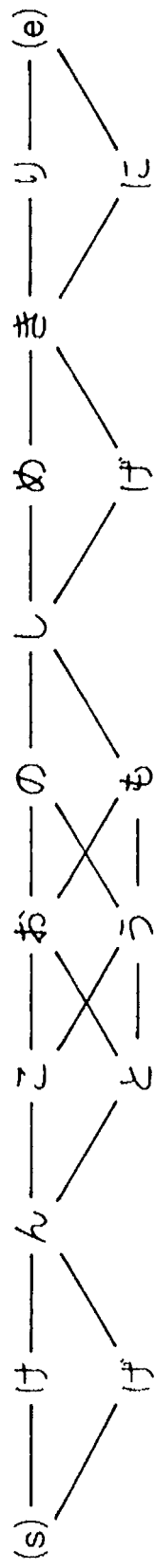
FIG. 10 is an illustration showing an example of voice to kanji and kana conversion shown in FIG. 1.

FIG. 10(3) shows an example of a phoneme lattice 92 which is outputted from the phoneme recognition function 41.

In this example, "け(ke)", "げ(ge)", "ん(n)", "こ(ko)", "と(to)", "お(o)", "う(u)", "の(no)", "も(mo)", "し(shi)", "め(me)", "げ(ge)", "き(ki)", "り(ri)", and "に(ni)" are all phoneme segments, and each phoneme segment has a record in the format shown in FIG. 7 (a).

The record of a word segment comprises, as shown in FIG. 7(b), a segment identification number 9211 for distinguishing the segment from other segments, a segment type 9212 for indicating that the segment is a word segment, a character expression 9213 for indicating the character expression of a word of the the segment, a probability 9214 for indicating certainty of the word of the segment, a list of preceding phoneme segments 9215 for indicating the segment identification number of the phoneme segment which precedes the segment, a list of succeeding phoneme segments 9216 for indicating the segment identification number of the phoneme segment which succeeds the segment, a list of preceding word segments 9217 for indicating the segment identification number of the word segment which precedes the segment, a list of succeeding word segments 9218 for indicating the segment identification number of the word segment which succeeds the segment, and a word segment group identification number 9219. The word segments are generated during the processing of the phoneme to character conversion function 12. The word segment group identification number 9219 has a role for grouping neighboring word segments when the phoneme to character conversion function 12 recognizes words contained in the set of candidate words composing the translation text from the phoneme lattice.

A lattice for a text comprises a phoneme segment corresponding to the phoneme recognized by the phoneme recognition function 41 and a word segment corresponding to the word recognized by the phoneme to character conversion function 12 as well as two dummy segments indicating the head and end of the text for efficient processing. The dummy segments are handled as phoneme or word segments depending on the processing so as to perform special processing at the head and end of the text though they are not phonemes.

Figure 8:
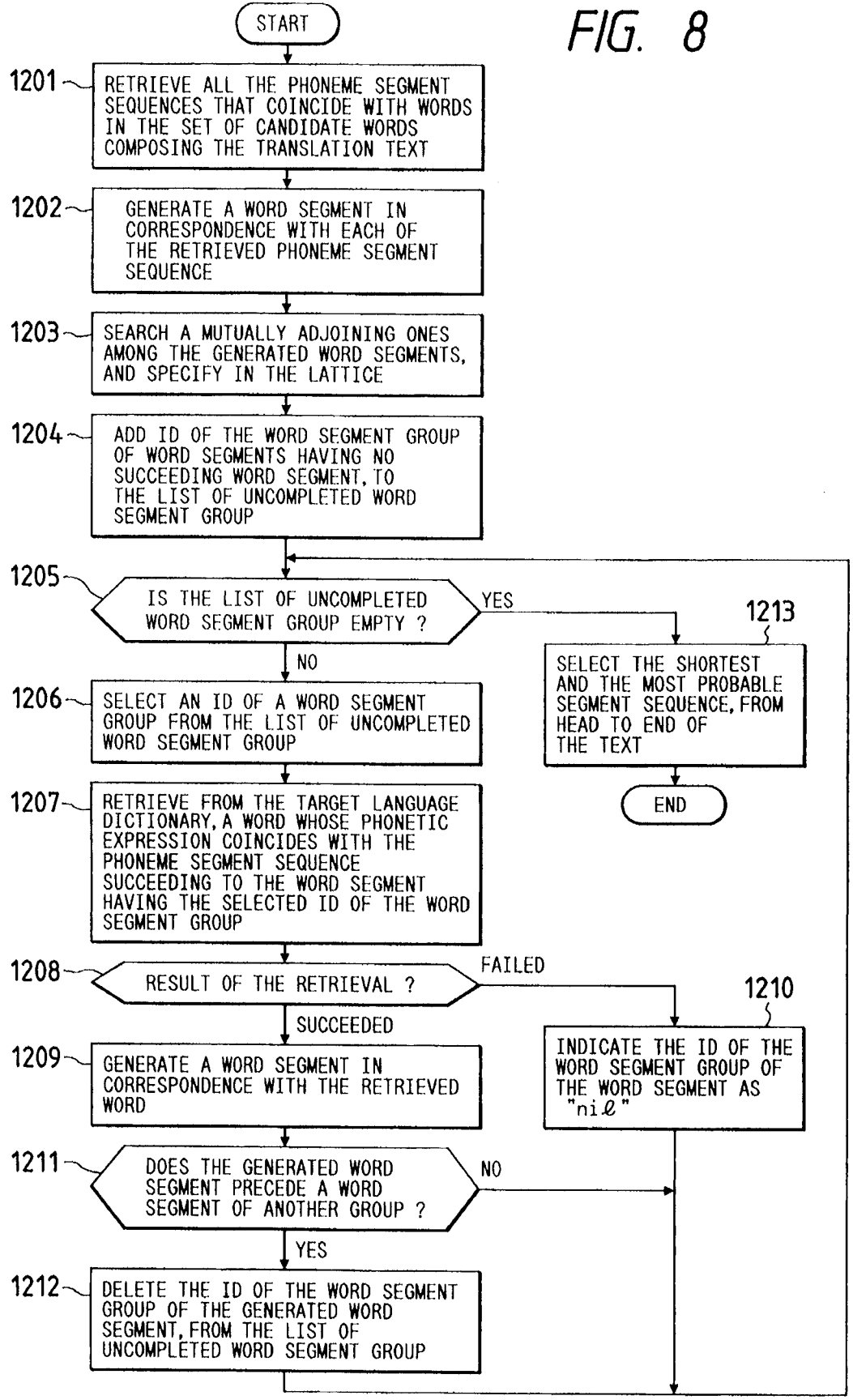
FIG. 8 is a processing flow chart of the phoneme to character conversion function shown in FIG. 1, FIGS. 9(a) and 9(b) are illustrations for processing the neighboring word segments shown in FIG. 1.

FIG. 8 is a processing flow chart of the phoneme to character conversion function shown in FIG. 1. The processing of the phoneme to character conversion function 12 comprises two phases.

In the first phase, words contained in the set of candidate words composing the translation text 91 are recognized in the phoneme lattice 92 which is an output of the phoneme recognition function 41 in a priority basis (Steps 1201 to 1203).

In the second phase, words in the segment in the phoneme lattice 92 which cannot be converted to words in the first phase are recognized by looking up the target language dictionary 22 (Steps 1204 to 1213). In the first phase, phoneme segment sequences in the lattice which coincide with words contained in the set of candidate words composing the translation text 91 are all retrieved (Step 1201), and a word segment is generated in correspondence with each of the retrieved phoneme segment sequences and connected to the phoneme lattice (Step 1202). Next, neighboring word segments are searched for among the generated ones and the neighboring is indicated in the data structure of the lattice (Step 1203).

At Step 1202, the contents of a generated word segment are determined as follows: The segment identification number 9211 is assigned a number which is different from those of other segments. The segment type 9212 is 'word segment'. The character expression 9213 is a copy of the character expression 9102 (FIG. 6) of the appropriate word in the set of candidate words composing the translation text 91. The probability 9214 is a sum of the probability 9204 of each of the phoneme segments composing the phoneme segment sequence which are grouped into the word segment (the sum is calculated and entered). The list of preceding phoneme segments 9215 is a copy of the list of preceding phoneme segments 9205 of the first phoneme segment of the phoneme segment sequence. Simultaneously, the segment identification number 9211 of a word segment which is being generated is written into the list of succeeding word segments 9208 of each phoneme segment which is written in the list of preceding phoneme segments 9205 of the first phoneme segment of the phoneme segment sequence. The list of succeeding phoneme segments 9216 is a copy of the list of succeeding phoneme segments 9206 of the last phoneme segment of the phoneme segment sequence. Simultaneously, the segment identification number 9211 of a word segment which is being generated is written into the list of preceding word segments 9207 off each phoneme segment which is written in the list of succeeding phoneme segments 9206 of the last phoneme segment of the phoneme segment sequence. The word segment group identification number 9219 is the same as its own segment number 9211.

Figure 9A:
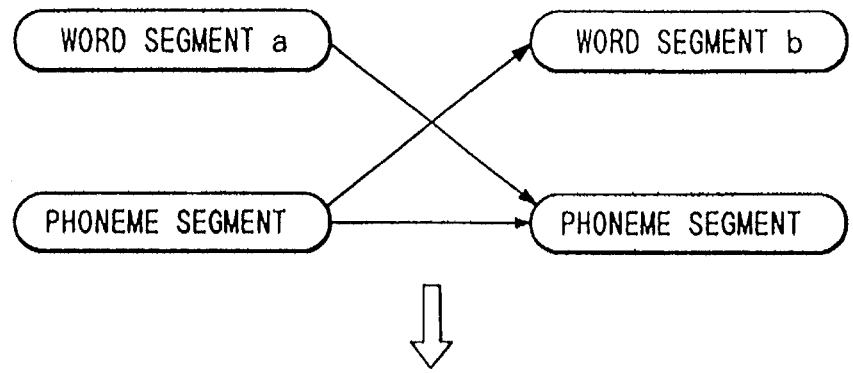
Figure 9B:
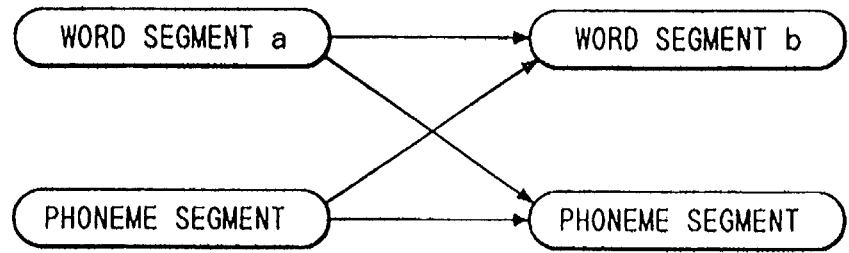

FIGS. 9(a) and 9(b) are processing illustrations of Step 1203.

As shown in FIG. 9(a), when one of the phoneme segments written in the list of succeeding phoneme segments 9216 of the word segment "a" succeeds one of the phoneme segments written in the list of preceding phoneme segments 9215 of the word segment "b", it is judged that the word segment "b" succeeds the word segment "a", and the structure is changed as shown in FIG. 9(b). Time segment identification number 9211 of the word segment "b" is written into the list of succeeding word segments 9218 of the word segment "a", and the segment identification number 9211 of the word segment "a" into the list of preceding word segments 9217 of the word segment "b".

In the second phase, the processing for converting the succeeding phoneme segment sequence to a word segment for a word segment having no succeeding word segment is repeated up to the backward word segment. First, the head in the lattice and word segments whose list of succeeding word segments 9218 is empty are searched for, and the word segment group identification number 9219 is added to the list of uncompleted word segment groups (Step 1204). Only one word segment group identification number is selected from the list of uncompleted word segments (Step 1206) until the list of uncompleted word segments becomes empty (Step 1205). For a word segment having the selected word segment group identification number, a word with the succeeding phoneme segment sequence which coincides with the phonetic expression 2201 is retrieved from the target language dictionary 22 (Step 1207). When the retrieval succeeds (Step 1208), a record of the word segment for the retrieved word is generated (Step 1209). When the retrieval fails (Step 1208), it means that the word segment in processing has no succeeding word segment. Therefore, so as to avoid the processing for repeating retrieval, the word segment group identification number 9219 of the word segment is indicated as "nil" (Step 1210). When it is found that in the processing for generating a word segment (Step 1209), the generated word segment precedes an existing word segment with a different word segment group identification number (Step 1211), the word segment group identification number 9219 of the generated word segment is deleted from the list of uncompleted word segments (Step 1212). When the list of uncompleted word segments becomes empty (Step 1205), it generally means that at least one word segment sequence from the head to the end is generated. When there is a segment wherein no phonogram string coincides with any word string, the word segment is discontinuous in the segment. When the list of uncompleted word segments becomes empty, a segment sequence for connecting the head and end with a minimum number of segments is selected. When a plurality of such segment sequences exist, a segment sequence wherein the sum of the probability of each segment composing the segment sequence is largest is selected (Step 1213). The phoneme to character conversion function 12 lists the character expression 9213 (a phonogram 9203 for the phoneme segment) of the word segments on the selected segment sequence sequentially as an output.

The word segment generation processing at Step 1209 is similar to the processing at Step 1202 or 1203 except the following two points: The first difference is that the character expression 9213 of a word segment to be generated is a copy of the word character expression 2203 of the record retrieved from the target language dictionary 22. Since the record of the target language dictionary 22 generally contains a plurality of character expressions 2203 (due to a homophone), a plurality of word segments corresponding to the character expressions are generated. The second difference is that the word segment group identification number 9219 is the same as the preceding word segment group identification number 9219.

FIGS. 10 (1) to 10 (4) show an example that a dictated translation text is converted to a kanji and kana text by the voice typewriter of the embodiment.

As shown in FIG. 10(1), the source text is a noun phrase of "deadline for manuscripts". It is assumed that the operator produces a voice of "げんこうのしめきり(genko no shimekiri)" as shown in FIG. 10(2). Assuming that the contents of the bilingual dictionary 21 and the target language dictionary 22 are as shown in FIGS. 3 and 4, the set of candidate words composing the translation text 91 which is outputted by the source text analysis function 11 is as shown in FIG. 6. It is assumed that the phoneme lattice 92 which is outputted by the phoneme recognition function 41 is as shown in FIG. 10(3). It is also assumed that when a plurality of segments are in parallel in the figure, the upper segments have higher probabilities. In this case, the conversion result of the phoneme to character conversion function 12 is as shown ill FIG. 10(4), and "原稿の締切り" is displayed on the CRT. "の" is reversely displayed (color of the character and that of the background is reversed) because there is a possibility of "も" as a next candidate.

Next, the processing of the phoneme to character conversion function 12 in the example shown in FIG. 10 will be described hereunder more in detail.

For the part which is sounded as "げんこう (genko)", for example, "けんこお (kenkoo)" is a most probable acoustic solution, though the phoneme lattice in FIG. 10(3) shows that there are possibilities of "けんこう (kenko)", "けんとお (kentoo)", "けんとう(kento)", "げんこお (genkoo)", "げんとお (gentoo)", or "げんとう (gento)". The phoneme to character conversion function 12 selects "げんこう (genko)" from them which is contained in the set of candidate words composing the translation text 91 and converts it to a character expression of "原稿" which is indicated by the set of candidate words composing the translation text 91. By doing this, "genko" whose probability is not acoustically highest is selected. There are no problems on a homophone imposed, such as "原稿", "現行", or "言行" for "genko"

As mentioned above, the ambiguity in voice recognition (a homophone to ambiguity of phoneme) is eliminated and a practical recognition rate can be obtained.

Next, the second embodiment of the present invention will be described hereunder. In the second embodiment, a kana to kanji conversion type word processor for translation will be described.

Figure 11:
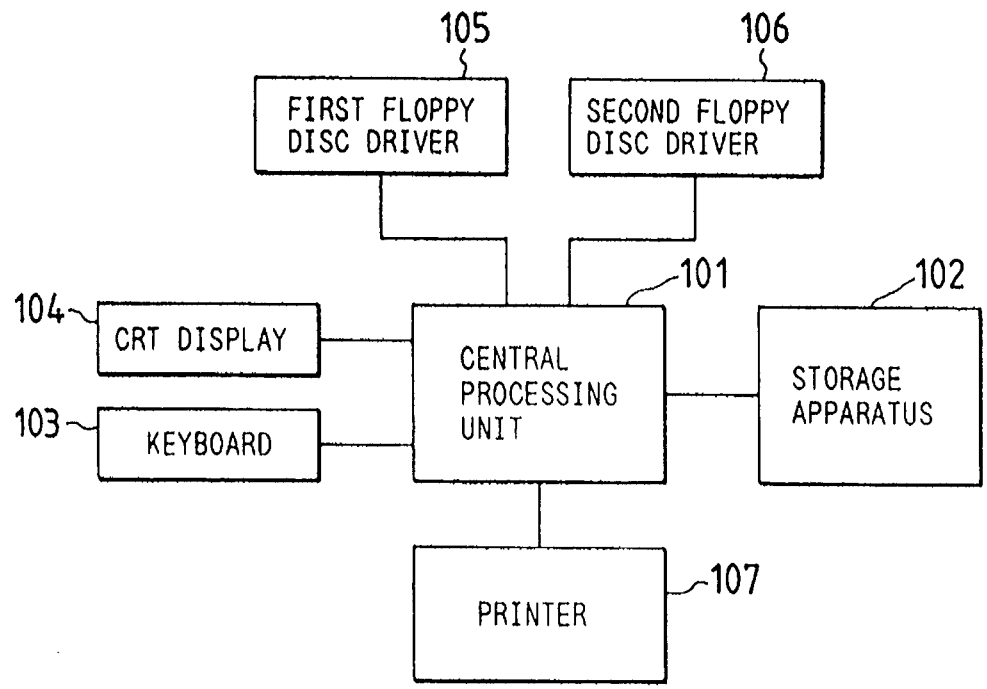
FIG. 11 is a hardware schematic view of a word processor for translation which is a second embodiment of the present invention.

FIG. 11 is a hardware schematic view of the word processor for translation of the present invention.

The word processor for translation in this embodiment comprises a central processing unit 101, a storage apparatus 102, a keyboard 103, a CRT display 104, a first floppy disc driver 105, a second floppy disc driver 106, and a printer 107.

Figure 12:
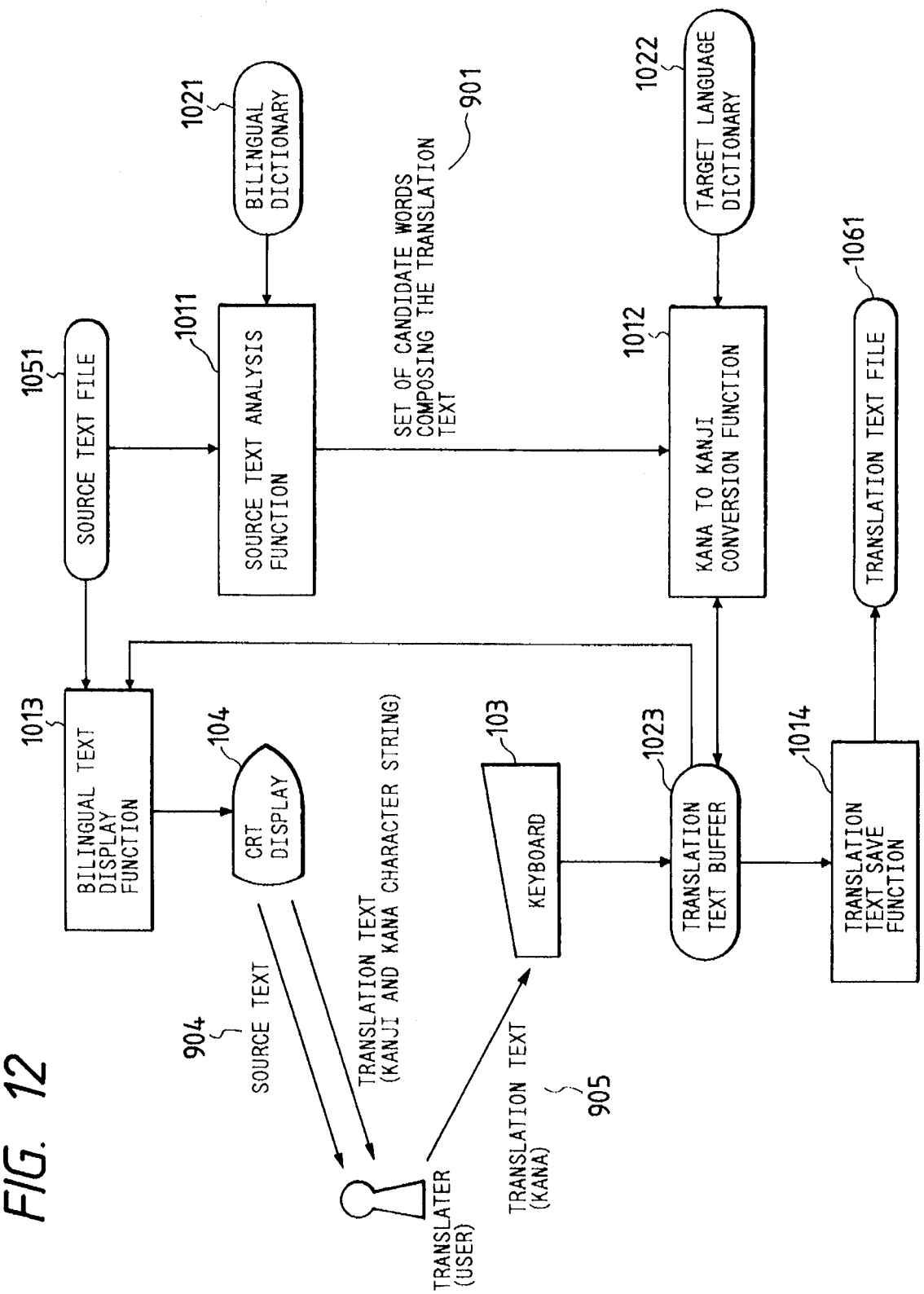
FIG. 12 is a function block diagram of the word processor for translation shown in FIG. 11.

FIG. 12 is a function block diagram of the word processor for translation shown in FIG. 11.

In FIG. 12, the source text analysis function 1011, the kana to kanji conversion function 1012, the bilingual text display function 1013, and the translation text save function 1014 are all program modules. The functions are executed by the arithmetic circuit of the central processing unit 101.

In the storage apparatus 102, the bilingual dictionary 1021 and the target language dictionary 1022 are stored, and furthermore an area for a translation text buffer 1023 for storing translation text data during the kana to kanji conversion processing is reserved.

Floppy discs which are set in the first floppy disc driver 105 and the second floppy disc driver 106 are used as a source text file 1051 and a translation text file 1061.

Next, the operation of the word processor for translation will be described hereunder.

First, the bilingual text display function 1013 reads the source text from the source text file 1051 and displays it in the source text display area of the CRT display 104. In this case, only one text to be processed is reversely displayed.

The source text analysis function 1011 analyzes the reversely displayed text morphologically, and obtains a set of candidate words composing the translation text 901 by retrieving the bilingual dictionary 1021.

The reversely displayed text 904 of the source text which is displayed on the CRT display 104 is translated by the operator, and the translation text 905 is inputted in kana from the keyboard 103. The inputted kana data is stored in the translation text buffer 1023. The kana to kanji conversion function 1012 reads the contents of the translation text buffer 1023 and converts a part of kana characters to kanji. When the part is converted, the kana to kanji conversion function 1012 replaces the appropriate kana character data in the translation text buffer 1023 with kana and kanji expression data. The kana to kanji conversion function 1012 selects words contained in the set of candidate words composing the translation text 901 in a priority basis. When it is found that a part of kana characters cannot be converted to a word contained in the set of candidate words composing the translation text 901, the kana to kanji conversion function 901 converts the part to a kanji and kana text by looking up the target language dictionary 1022.

The bilingual text display function 1013 always monitors the translation buffer 1023, and displays latest buffer contents in the translation text display area of the CRT display 104. When it is detected that a symbol inputted from the keyboard 103 is a symbol of sentence end, the bilingual text display function 1013 changes the reversely displayed text in the display area of the source text to the next text.

The translation text save function 1014 also monitors the translation text buffer 1023 always. When the sentence end symbol is detected, the translation text save function 1014 saves the contents of the translation text buffer 1023 in the translation text file 1061 and clears the translation text buffer 1023.

Figure 13:
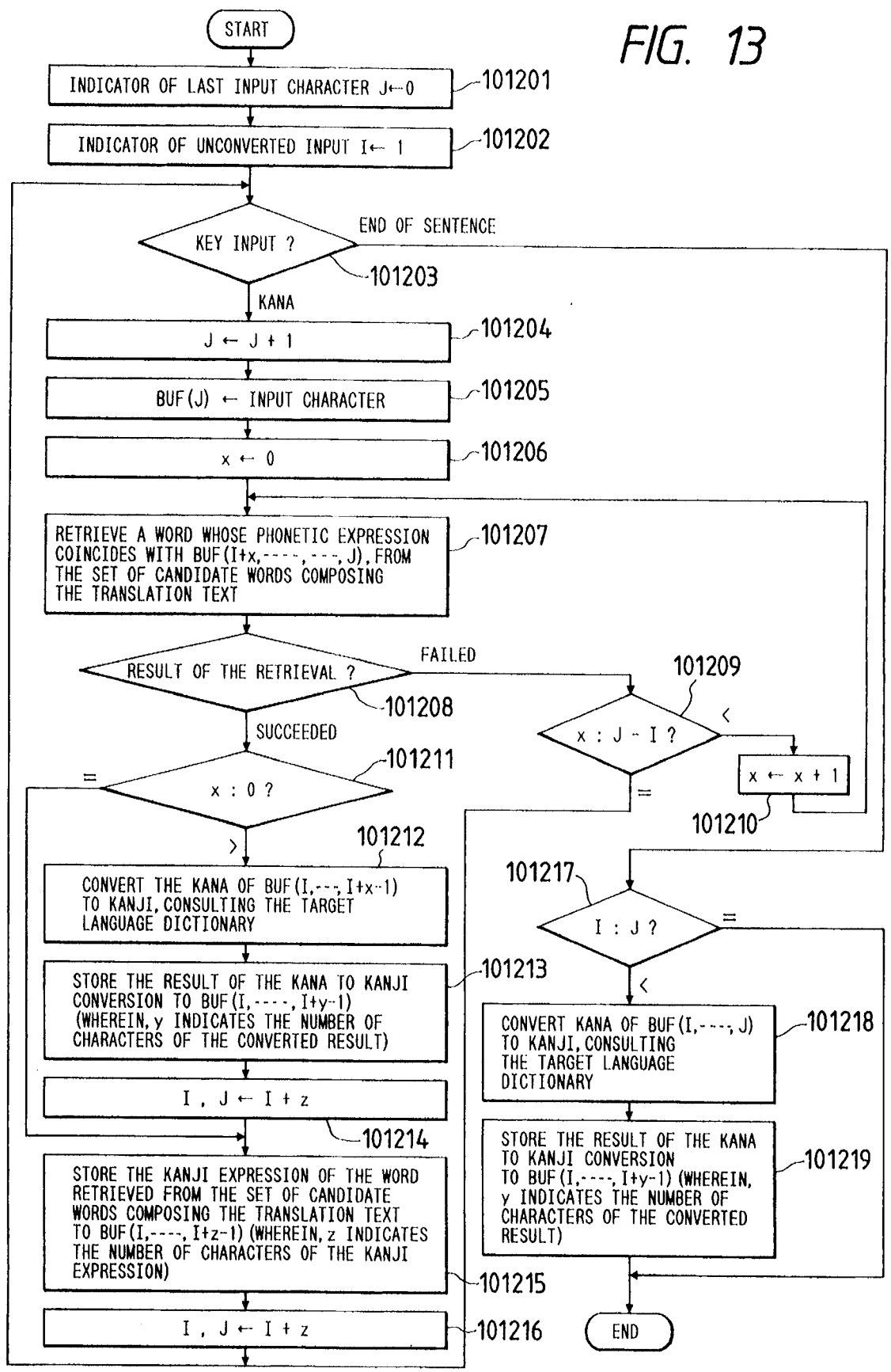
FIG. 13 is a processing flow chart of the kana to kanji conversion function shown in FIG. 11.

FIG. 13 is a processing flow chart of the kana to kanji conversion function shown in FIG. 12. Since the bilingual dictionary 1021, the target language dictionary 1022, and the source text analysis function 1011 are the same as those of the first embodiment, the description of them will be omitted.

In FIG. 13, BUF indicates the translation text buffer 1023, and the "i"th character of the buffer is indicated by BUF(i) and a character string from the "i"th character to the "j"th character of the buffer by BUF (i, —, j). The indicator of unconverted input for indicating the position of the first character of the part in the buffer wherein the kana to kanji conversion is not finished is indicated by I, and the indicator of last input character for indicating the position of the last character in the buffer by J.

When it is detected that the translation text buffer 1023 is cleared by the translation text save function 1014, the kana to kanji conversion function 1012 resets the indicator of last input character J to an initial value of 0 (Step 101201) and the indicator of unconverted input I to an initial value of 1 (Step 101202). Thereafter, the kana to kanji conversion function 1012 waits for input from the keyboard 103 (Step 101203). When data is inputted, the kana to kanji conversion function 1012 repeats the steps from 101204 to 101216 until the symbol of sentence end is inputted. When kana characters are newly inputted, the kana to kanji conversion function 1012 increments the indicator of top position J by one (Step 101204), stores the inputted kana characters in BUF(J) (Step 101205), and then executes the kana to kanji conversion for BUF ( I, —, J) . First, the kana to kanji conversion function 1012 retrieves a word which coincides with the kana expression of a kana character string behind BUF (I, —, J) which is as long as possible from the set of candidate words composing the translation text 901. For that purpose, by increasing a variable x one by one starting at 0, the kana to kanji conversion function 1012 retrieves a word which coincides with the phonetic expression of BUF(I+x, —, J) from the set of candidate words composing the translation text 901 until x reaches J-I (Steps 101206, 101207, 101208, 101209, 101210). When the retrieval fails for all the values until x reaches J-I (Steps 101208, 101209), the kana to kanji conversion function 1012 waits for the next kana being keyed (Step 101203).

When the retrieval of the set of candidate words composing the translation text 901 succeeds (Step 101208), the kana to kanji conversion function 1012 replaces the kana character string in BUF with a kanji string and waits for next kana input (Steps 101211 to 101216, 101203) . When x is 0 or BUF (I, —, J) comprises only words contained in the set of candidate words composing the translation text 901, the kana to kanji conversion function 1012 immediately stores the kanji expression (character expression 9102 shown in FIG. 6) indicated in the set of candidate words composing the translation text 901 in BUF. The kana to kanji conversion function 1012 stores the kanji expression with a length of z in BUF(I, —, I+z–1) (Step 101215), and updates I and J so as to indicate the next position of the stored kanji expression (Step 101216). When x>0 or a backward part of BUF(I, —, J) comprises words contained in the set of candidate words composing the translation text 901, the kana to kanji conversion function 1012 executes the kana to kanji conversion for BUF (I, —, I+x–1) which is an unconverted part using the target language dictionary 1022 (Step 101212). The kana to kanji conversion is performed by the conventional method, though kana to kanji conversion with fewer words provided after conversion is performed in a priority basis so as to improve the conversion accuracy. Assuming that the kana to kanji conversion result of BUF(I, —, I+x–1) is a character string with a length of y, the kana to kanji conversion function 1012 stores it in BUF(I, —, I+y–1) (Step 101213) and updates I and J so as to indicate the next one of the stored kanji string (Step 101214). Thereafter, the kana to kanji conversion function 1012 stores the kanji expression of a word, which is retrieved from the set of candidate words composing the translation text 901 and left unstored in BUF, in BUF in the foregoing way (Step 101215), and updates I and J so as to indicate the next one of the stored kanji string (Step 101216).

When the symbol inputted from the keyboard 103 becomes a symbol of sentence end finally (Step 101203), the kana to kanji conversion function 1012 judges whether the end of sentence is converted from kana to kanji (Step 101217). When the conversion is not finished, the kana to kanji conversion function 1012 converts the end of sentence from kana to kanji using the target language dictionary 1022 (Step 101218), stores the conversion result in BUF (Step 101219), and terminates the processing.

Figures 14, 15:
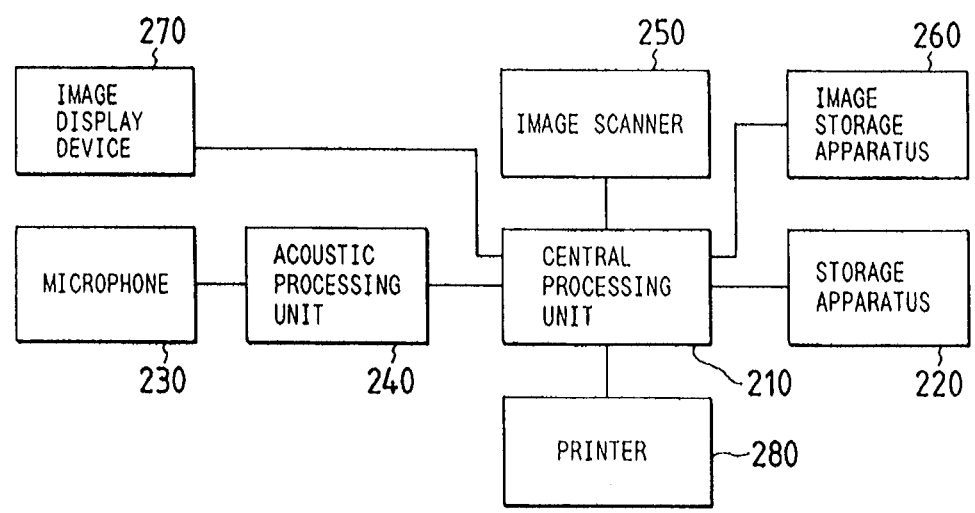
FIG. 14 is an illustration showing an example of kana to kanji conversion shown in FIG. 11.
FIG. 15 is a hardware schematic view of an image comment text inputting apparatus which is a third embodiment of the present invention.

FIG. 14 is an illustration of an example of kana to kanji conversion of the word processor for translation of the present invention.

In the figure, a translation text inputted in kana is converted to a kanji and kana text. The source text on the screen which is viewed by the operator is a noun phrase of "deadline for manuscripts" as shown in FIG. 14(1). It is assumed that the operator translates it and inputs "げんこうのていしゅつきげん (genko no teishutsu kigen)" in kana from the keyboard 103 as shown in FIG. 14(2).

Assuming that the bilingual dictionary 1021 and the target language dictionary 1022 have the contents shown in FIGS. 3 and 4, the source text analysis function 1011 outputs a set of candidate words composing the translation text shown in FIG. 6.

FIG. 14(3) shows a condition that whenever a kana character is inputted, the translation text display on the CRT display 104 is changed. As shown in the parts of "げんこう (genko)" and "きげん (kigen)" the problem of homophone is solved by analyzing the source text beforehand. In the conventional kana to kanji conversion processing, "原稿", "現行", "言行" and others are candidates for "げんこう (genko)" and "期限", "起源", "紀元", and others for "kigen". In the present invention, the source text analysis function 1011 extracts "原稿" and "期限" as candidate words and the others candidates are abandoned. For a part which does not coincide with candidate words extracted by the source text analysis function 1011, such as the part of "のていしゅつ(no teishutsu)", a problem of homophone may be imposed.

Another advantage of the embodiment is that a part which coincides with the kana expression of one of the candidate words extracted by the source text analysis function 1011 can be judged as a word in a high probability. Therefore, a closely typed kana character string can be divided into words highly accurately. As a result, the burden imposed on the operator in the kana to kanji conversion processing can be extremely lightened.

Next, modification examples of the first embodiment (voice typewriter) and the second embodiment (kana to kanji conversion type word processor) will be described hereunder.

In the first embodiment, the entire translation text is inputted in voice, while in the second embodiment, it is inputted in kana. The present invention may be applied to a case that a fragment of the translation text is inputted as the case that the result of machine translation is post-edited. As another embodiment of the present invention, a translation text editing apparatus for inputting a text or phrase, which is to be inserted into the translation text or replaced, in voice or kana may be realized. It is assumed, for example, that although "manuscript" is translated as "手書き" by machine translation, "げんこう(genko)" is dictated by the operator so as to correct "手書き" to "原稿". Since "原稿," is extracted as a candidate word from "manuscript" in the source text, "genko" is converted to "原稿". By extracting candidate words composing a text or phrase to be inserted or replaced by analyzing the source text, the accuracy of voice recognition and kanji to kana conversion of the text or phrase to be inserted or replaced can be improved.

As another modification example, an apparatus for inputting an abstract of a text instead of translation can be realized. Since most words composing an abstract are often contained in the source text, they can be used for voice recognition or kana to kanji conversion of the abstract text by considering the words composing the source text as candidate words composing the abstract text.

Since important words, for example, "who", "when", "where", and "what" are all contained in the source text when a text is created using only essential points of the text, voice recognition or kana to kanji conversion of the abstract text can be realized highly accurately by using the words comprising the source text as candidate words composing the abstract text.

Next, an image comment text inputting apparatus will be described in detail as a third embodiment of the present invention. When a specialist analyzes an image and dictates comments in voice, the apparatus converts the dictated comments to characters. FIG. 15 is a hardware schematic view of the image comment text inputting apparatus showing the third embodiment of the present invention.

The comment text inputting apparatus comprises a central processing unit 210, a storage apparatus 220, a microphone 230, an acoustic processing unit 240, an image scanner 250, an image storage apparatus 260, an image display device 270, and a printer 280.

Figure 16:
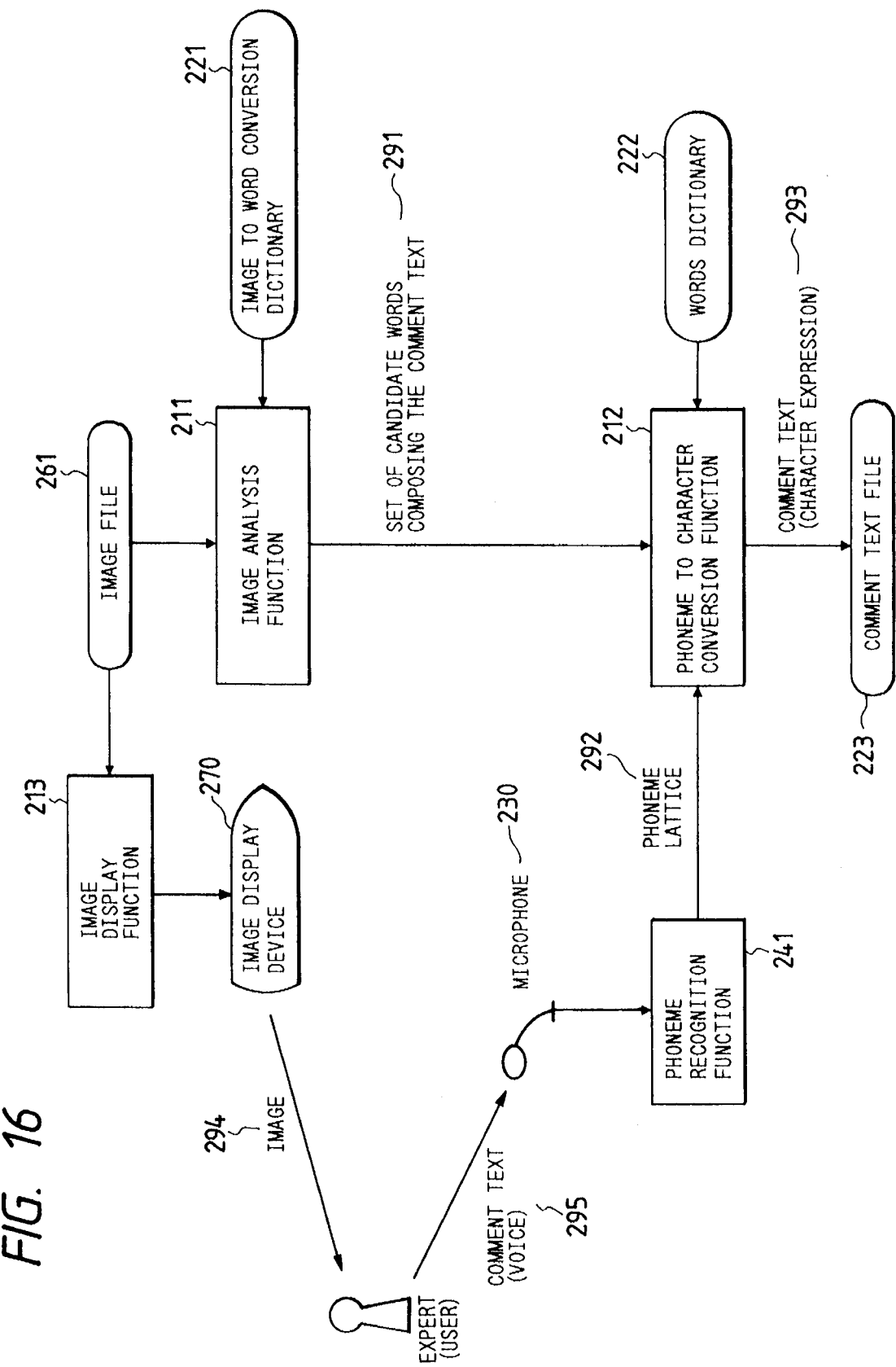
FIG. 16 is a function block diagram of the image comment text inputting apparatus shown in FIG. 15.

FIG. 16 is a function block diagram of the image comment text inputting apparatus shown in FIG. 15.

An image analysis function 211, a phoneme to character conversion function 212, and an image display function 213 are program modules, and the functions are performed by the central processing unit 212. A phoneme recognition function 241 is performed by the acoustic processing unit 240.

The areas of an image to word conversion dictionary 221, a word dictionary 222, and a comment text file 223 are reserved in the storage apparatus 220. Since an image file 261 has a very large memory capacity, it is stored in an area of the image storage apparatus 260. Images are stored in the image file 261 via the image scanner 250.

Next, the operation of the image comment text inputting apparatus will be described hereunder.

First, the image display function 213 reads the image data which is selected by the operator from the image file 261, and displays it on the image display device 270. Next, the image analysis function 211 extracts features of the displayed image and obtains a set of candidate words composing the comment text 291 by looking up the image to word conversion dictionary 221. The image to word conversion dictionary 221 allows a feature pattern of an image to correspond to an associated word of the feature pattern, and is provided in each application field. Information on a word contains the phonetic expression thereof and a character expression. The image analysis function 211 detects a feature pattern contained in an image by pattern matching with the feature pattern in the image to word conversion dictionary 221 and outputs the word information corresponding to the feature pattern into the storage area of the set of candidate words composing the comment text 291.

Viewing an image 294 displayed on the screen of the image display device 270, the operator dictates a comment text 295, for example, an interpretation or opinion on the image, and the microphone 230 converts the voice to an electric signal. The phoneme recognition function 241 analyzes the voice waveform of the inputted electric signal, performs segmentation, extracts the feature parameter, and converts the inputted voice to a phoneme lattice 292.

Next, the phoneme to character conversion function 212 converts the phoneme lattice 292 which is an output of the phoneme recognition function 241 to a word string. In this case, the phoneme to character conversion function 212 selects words contained in the set of candidate words composing the comment text 291 which is an output of the image analysis function 211 in a priority basis. As to a segment which cannot be converted to words contained in the set of candidate words composing the comment text 291, the phoneme to character conversion function 212 converts it to a word string by looking up the word dictionary 222. Since the word dictionary 222 is the same as the target language dictionary shown in the first embodiment, the description of the contents will be omitted. Since the contents of the set of candidate words composing the comment text 291 and the word dictionary 222 contain character express iotas of words, the phoneme to character conversion function 212 creates a character expression 293 of the comment text immediately on the basis of the word string converted from the phoneme lattice 292 and stores it in the comment text file 223. The comment text stored in the comment text file 223 is printed by the printer 280.

When this embodiment is compared with the first embodiment, the processing that a dictated text is converted to characters is performed in both embodiments, though candidate words composing the translation text are extracted by analyzing the source text in the first embodiment, while candidate words composing the comment text are extracted by analyzing the source image in this embodiment. Therefore, it is needless to say that voice is converted to characters highly accurately also in this embodiment. Image data can be analyzed by a computer up to a certain level but cannot be done above the level, and an image data analysis is often made by a decision of a specialist. In this embodiment, by inputting voice dictated by the specialist in the natural state, the decision result can be surely inputted.

Next, the character recognition apparatus with voice input function will be described hereunder as a fourth embodiment of the present invention.

In the character recognition apparatus, when the first solution of character recognition does not differ greatly in probability from the second solution, the character is displayed for the operator, and the correct solution can be selected by outputting the phonetic expression of the character or of a word containing the character by the operator. When the operator sounds the phonetic expression, the character recognition apparatus recognizes the voice and obtains a solution using both the voice recognition result and the previous character recognition result. Since the operator does not sound the entire text but only a part of the displayed characters or the displayed word, it takes little time, and a combination of the character recognition result and the voice recognition result eliminates the ambiguities of both recognitions and the recognition rate is extremely improved.

Figure 17:
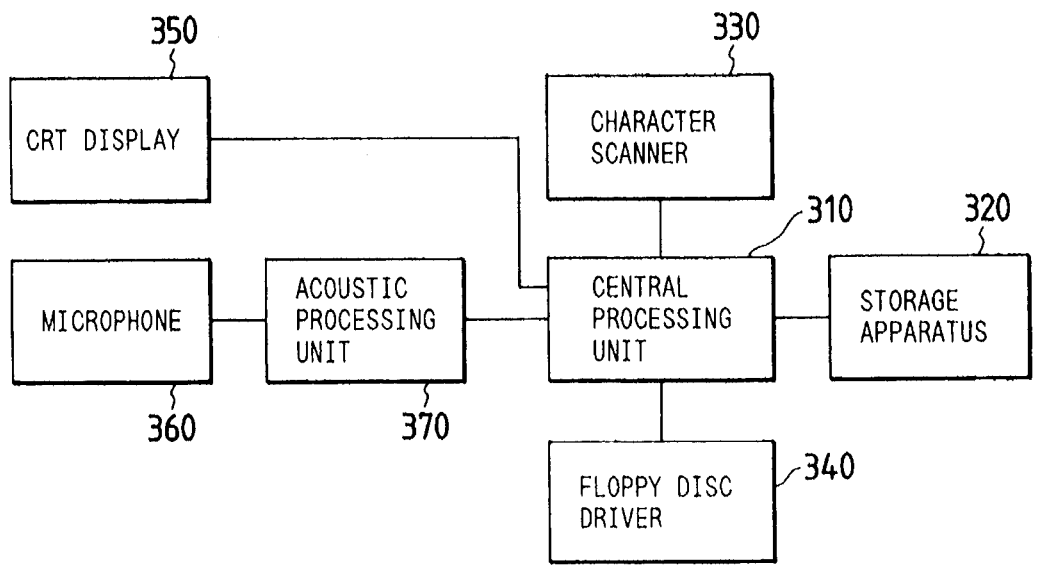
FIG. 17 is a hardware schematic view of a character recognition apparatus with voice input function which is a fourth embodiment of the present invention.

FIG. 17 is a hardware schematic view of the character recognition apparatus with voice input function showing the fourth embodiment of the present invention.

The character recognition apparatus of this embodiment comprises a central processing unit 310, a storage apparatus 320, a character scanner 330, a floppy disc driver 340, a CRT display 350, a microphone 360, and an acoustic processing unit 370.

Figure 18:
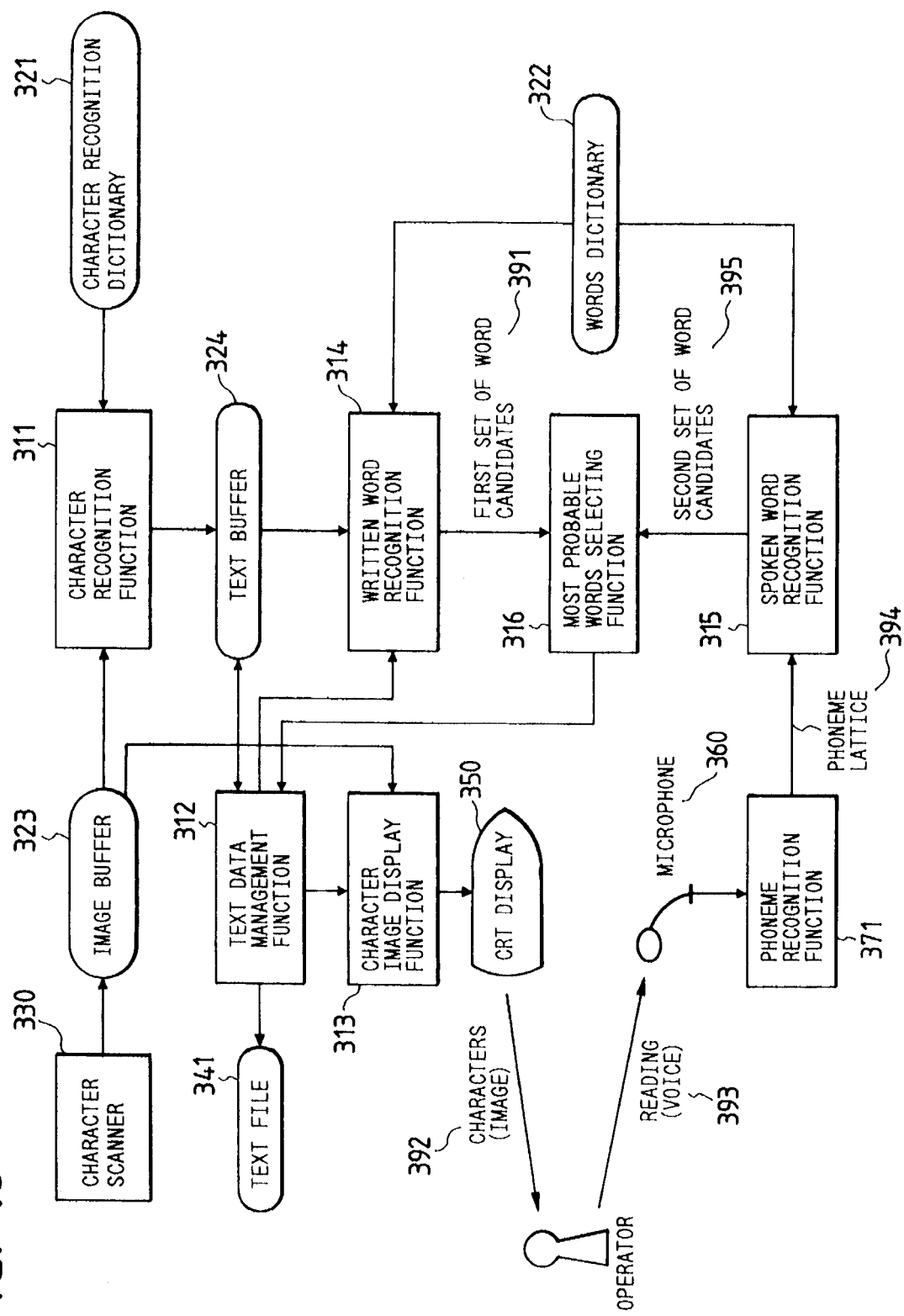
FIG. 18 is a function block diagram of the character recognition apparatus with voice input function shown in FIG. 17.

FIG. 18 is a function block diagram of the character recognition apparatus with voice input function shown in FIG. 17.

A character recognition function 311, a text data management function 312, a character-image display function 313, a written word recognition function 314, a spoken word recognition function 315, and a most probable words selecting function 316 are all program modules, and the functions are performed by the arithmetic circuit of the central processing unit 310.

In the storage apparatus 320, a character recognition dictionary 321 and a word dictionary 322 are stored, and the areas for an image buffer 323 and a text buffer 324 are reserved. A floppy disc which is set in the floppy disc driver 340 is used as a text file 341.

Next, the operation of the character recognition apparatus with voice input function will be outlined hereunder.

First, the character scanner 330 reads characters as images and stores the read characters in the image buffer 323 one by one.

The character recognition function 311 recognizes a character pattern in the image buffer 323 by looking up the character recognition dictionary 321. The text data management function 312 detects ambiguous one among the recognized characters, outputs it to the CRT display 350 by the character-image display function 313, and allows the operator to dictate the reading of the word containing the character. The written word recognition function 314 outputs a first set of word candidates 391 to the most probable words selecting function 316 by looking up the word dictionary 322 for the ambiguous character.

The spoken word recognition function 315 outputs a second set of word candidates 395 to the most probable words selecting function 316 by recognizing the voice dictated by the operator.

The most probable words selecting function 316 receives the first set of word candidates 391 from the written word recognition function 314 and the second set of word candidates 395 from the spoken word recognition function 315, and selects words which are commonly contained in both sets of word candidates. The text data management function 312 updates the text data in the text buffer 324 on the basis of the selection result of the most probable words selecting function 316.

Next, the operation of each function will be described in detail.

The character recognition function 311 fetches image data from the image buffer 323 character by character, extracts the feature, and recognizes the character by looking up the character recognition dictionary 321. The character recognition dictionary 321 allows the feature pattern of a character as an image to correspond to the character code. The character recognition function 311 allows the image pattern which is read from the image buffer 323 to match with the feature pattern in the character recognition dictionary 321, selects the character code corresponding to the feature pattern with a maximum match as a first solution, and outputs it to the text buffer 324. However, when a plurality of feature patterns, wherein the difference in matching between them and the first solution is less than a predetermined value, exist, the character recognition function 311 judges that they are ambiguous and outputs a plurality of character codes corresponding to those feature patterns to the text buffer 324. Assuming the pattern matching as a probability of the solution, the character recognition function 311 outputs it to the text buffer 324 simultaneously with the character codes.

The text data management function 312 always monitors the text buffer 324. When an ambiguous result (matching with the character code) is written into the text buffer 324, the text data management function 312 informs the character-image display function 313 and the written word recognition function 314 of the location thereof in the text.

When the character-image display function 313 is informed of the location where ambiguity occurs in the character recognition processing, it reads the image pattern around the location from the image buffer 323 and displays it on the CRT display.

The character-image display function 313 displays only ambiguous characters in the blinking state and other characters in the general state.

When the written word recognition function 314 is informed of the location where ambiguity occurs in character recognition, it reads the text data around the location from the text buffer 324 and retrieves the word dictionary 322 using the character string containing the character wherein ambiguity occurs in character recognition as a key. The word dictionary 322 is a set of vocabularies of the target language of the character recognition function, and stores the character expression and phonetic expression of each word which correspond to each other. The word dictionary 322 is structured so that it can be retrieved by using the character expression as a key so as to satisfy the retrieval request of the written word recognition function 314 and so that it can be retrieved by using the phonetic expression as a key so as to satisfy the retrieval request of the spoken word recognition function 315. The written word recognition function 314 retrieves the word dictionary 322 for possibilities of all the character strings contained in the text data, and outputs a set of character strings (words) for which the retrieval succeeds. The written word recognition function 314 reads the probability of each character composing a word from the text buffer 324, calculates the sum of probabilities, and outputs it as a probability of the word. A set of words which is outputted by the written word recognition function 314 is called a first set of word candidates. When characters 392 are displayed on the CRT display 350 in the blinking state by the character-image display function 313, the operator looks at them and sounds the reading 393 of a word containing the characters. The microphone 360 converts the voice of the reading 393 to an electric signal.

The phoneme recognition function 371 analyzes the voice waveform of the reading 393, performs segmentation, extracts the feature pattern, and converts the inputted voice to a phoneme lattice 394. The phoneme lattice 394 contains all possible phonogram strings in consideration of ambiguity in segmentation and labeling by the segment phonogram when the voice is converted to a phonogram string.

The spoken word recognition function 315 retrieves the word dictionary 322 using each of the phonogram strings contained in the phoneme lattice 394 which is an output of the phoneme recognition function 371 as a key. The spoken word recognition function 315 reads the character expressions of words corresponding to all the phonogram strings, for which the retrieval succeeds, from the word dictionary 322, and outputs them as a second set of word candidates 395. The spoken word recognition function 315 sums up the probability of each of the phonograms composing the phonogram strings to which the words correspond and outputs it as a probability of the words.

The most probable words selecting function 316 retrieves words commonly contained in the first set of word candidates 391 and the second set of word candidates 395. When one word which is commonly contained exists, the most probable words selecting function 316 selects it as a solution and informs the text data management function 312 of it. When a plurality of words which are commonly contained exist, the most probable words selecting function 316 selects the sum of the probability of the first set of word candidates 391 and the probability of the second set of word candidates 395, which is maximum, as a solution and informs the text data management function 312 of it. When no word which is commonly contained exists, the most probable words selecting function 316 informs the text data management function 312 of it.

When the text data management function 312 is informed of the processing result from the most probable words selecting function 316, it updates the text data in the text buffer 324 according to the processing result. When the most probable words selecting function 316 obtains a solution and informs the text data management function 312 of it, the management function 312 deletes characters which conflict with the solution from the text data. When the most probable words selecting function 316 cannot obtain a solution, the management function 312 selects a character to which a maximum probability is given by the character recognition function 311 and deletes other competitive solutions. By doing this, the text data management function 312 updates the text data in the text buffer 324, and transfers the updated text data from the text buffer 324 to the text file 341.

By doing this, the character recognition apparatus with voice input function of this embodiment eliminates ambiguity by a combination of voice recognition and character recognition When a word of "一方 (ippo)" for example, is recognized as character recognition, "一万 (ichiman)", "一方 (ippoh)", and "一力(ichiriki)" for example, are obtained as solution candidates. When the operator provides reading by sounding as "ippo" in this case, ambiguity occurs also in voice recognition. For example, "いっぽ (ippo)", "いっぽう (ippoh)", "いほう (ihoh)", and "いっぽう(ihhoh)" are obtained. When the word dictionary 322 is retrieved using those words as keys, "一歩", "一方", "一報", "違法", and "異邦" are obtained as solution candidates. Since only "一方" is commonly contained in solution candidates by character recognition and solution candidates by voice recognition, this word is decided as a solution.

By doing this, operator intervention in the character recognition apparatus of the present invention can be performed in a natural form that a word indicated by the apparatus is read. There is a conventional method which is often used, such that a correct one is selected from a plurality of candidates indicated by the apparatus. However, there is a problem imposed that when there are many candidates, it takes a lot of time to search for a correct solution. Since the method of the present invention is such that a word indicated by the apparatus is just read, it is extremely efficient and simple.

Next, a voice typewriter for simultaneous translation will be described as a fifth embodiment of the present invention.

The voice typewriter converts both the source text by a speaker in the first language and the translation text translated by a simultaneous interpreter from voice to characters.

Figure 19:
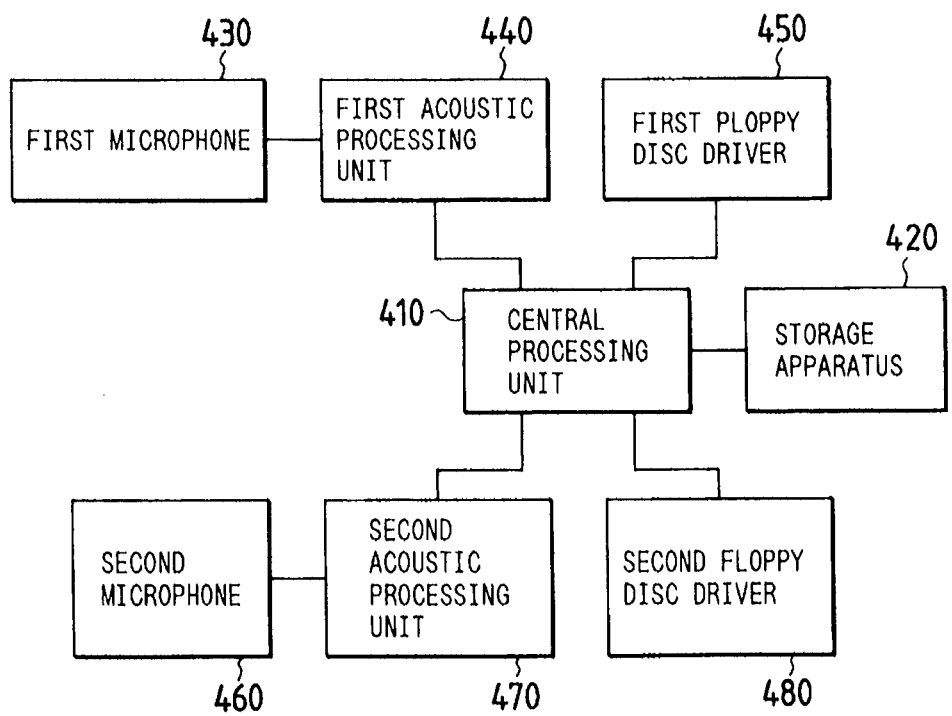
FIG. 19 is a hardware schematic view of a voice typewriter for simultaneous translation which is a fifth embodiment of the present invention.

FIG. 19 is a hardware schematic view of a voice typewriter for simultaneous translation which is a fifth embodiment of the present invention.

The voice typewriter for simultaneous translation of this embodiment comprises a central processing unit 410, a storage apparatus 420, a first microphone 430, a first acoustic processing unit 440, a first floppy disc driver 450, a second microphone 460, a second acoustic processing unit 470, and a second floppy disc driver 480.

Figure 20:
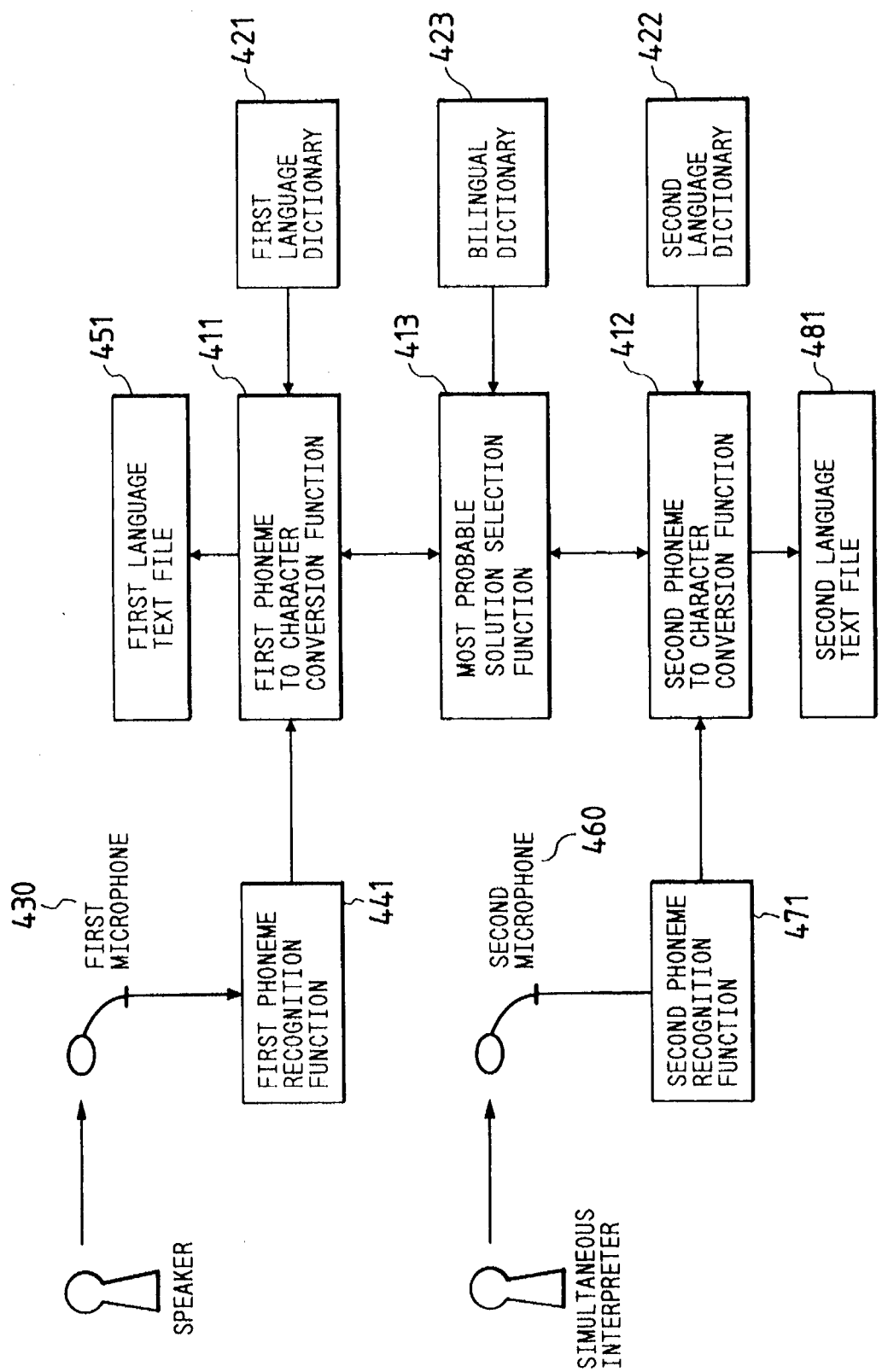
FIG. 20 is a function block diagram of the voice typewriter for simultaneous translation shown in FIG. 19.

FIG. 20 is a function block diagram of the voice typewriter for simultaneous translation shown in FIG. 19.

A first phoneme to character conversion function 411, a second phoneme to character conversion function 412, and a most probable solution selection function 413 are all program modules, and the functions are performed by the arithmetic circuit of the central processing unit 410. A first phoneme recognition function 441 and a second phoneme recognition function 471 are performed by the first acoustic processing unit 440 and the second acoustic processing unit 470. A first language dictionary 421, a second language dictionary 422, and a bilingual dictionary 423 are stored in the storage apparatus 420. Floppy discs which are set in the first floppy disc driver 450 and the second floppy disc driver 480 are used as a first language text file 451 and a second language text file 481.

Next, the operation of the voice typewriter for simultaneous translation will be described hereunder. When the speaker dictates the first language source text, the first microphone 430 converts the voice to an electric signal. The first phoneme recognition function 441 analyzes the voice waveform of the source text, performs segmentation, extracts the feature pattern, and converts the inputted voice to a phoneme lattice. Next, the first phoneme to character conversion function 411 converts the phoneme lattice to a word lattice by looking up the first language dictionary 421. The word lattice is a bundle of a plurality of word strings and expresses the voice recognition result in an ambiguous form.

When the first language source text which is dictated by the speaker is translated and dictated by the simultaneous interpreter in the second language, the second microphone 460 converts the voice to an electric signal. The second phoneme recognition function 471 analyzes the voice waveform of the translation text, performs segmentation, extracts the feature pattern, and converts the inputted voice to a phoneme lattice. Next, the second phoneme to character conversion function 412 converts the phoneme lattice to a word lattice by looking up the second language dictionary 422.

The most probable solution selection function 413 receives the word lattice of the source text from the first phoneme to character conversion function 411 and the word lattice of the translation text from the second phoneme to character conversion function 412 and compares them. The most probable solution selection function 413 retrieves the words contained in the word lattice of the source text from the bilingual dictionary 423, obtains a translation of each word in the second language, and checks whether each translation is contained in the word lattice of the translation text. By doing this, the most probable solution selection function 413 extracts all translations contained in the word lattice of the source text and the word lattice of the translation text. The most probable solution selection function 413 informs the first phoneme to character conversion function 411 of a set of first language words contained in the extracted translations. The set of words is called a set of most probable first language words. The most probable solution selection function 413 informs the second phoneme to character conversion function 412 of a set of second language words contained in the extracted translations in the same way. The set of words is called a set of most probable second language words.

When the first phoneme to character conversion function 411 receives the set of most probable first language words from the most probable solution selection function 413, it obtains a most probable word string from the word lattice of the source text. The first phoneme to character conversion function 411 reduces the word lattice to a word string by leaving words contained in the set of most probable first language words in a priority basis and deleting competitive words. As to a segment where words contained in the set of most probable first language words are competitive with each other or where no words contained in the set of most probable first language words are found, the first phoneme to character conversion function 411 leaves words with an acoustically highest probability. The conversion function 411 outputs the word string which is obtained in this way to the first language text file 451.

Exactly in the same way, when the second phoneme to character conversion function 412 receives the set of most probable second language words from the most probable solution selection function 413, it obtains a most probable word string from the word lattice of the translation text. The second phoneme to character conversion function 412 reduces the word lattice to a word string by leaving words contained in the set of most probable second language words in a priority basis and deleting competitive words. As to a segment where words contained in the set of most probable second language words are competitive with each other or where no words contained in the set of most probable second language words are found, the second phoneme to character conversion function 412 leaves words with an acoustically highest probability. The conversion function 412 outputs the word string which is obtained in this way to the second language text file 481.

In the voice typewriter for simultaneous translation of this embodiment, the voice recognition result of the source text and the voice recognition result of the translation text are combined to eliminate the ambiguity contained in each of them and the final accuracy of voice recognition is extremely improved.

In the present invention, as mentioned above, various apparatuses can be realized depending on the type of combination. By a combination of the source text using characters and the translation text using voice, a voice typewriter for translation which converts the translation text from voice to a character expression can be realized. By a combination of the source text using characters and the translation text using kana or romaji, a word processor for translation which converts the translation text from kana or romaji to a kanji and kana text can be realized. By a combination of a text and an abstract thereof, an abstract text inputting apparatus for dictating the abstract of the text or inputting the text in kana or romaji and converting it to a character expression can be realized. By a combination of an image and a comment text for the image, an image comment text inputting apparatus for dictating the comment text for the image or inputting the comment text in kana or romaji and converting it to a character expression can be realized. By a combination of characters as an image and the reading of characters or a word, a highly accurate character recognition apparatus can be realized. By a combination of first language voice and simultaneous translation voice to the second language, a voice typewriter for simultaneous translation can be realized.

In the present invention, as mentioned above, by analyzing a plurality of inputs which are mutually related, obtaining candidate solutions for conversion or recognition of each input, and selecting a pair of solutions which are consistent each other, the accuracy of conversion or recognition can be extremely improved compared with a case that only one input is analyzed.

What is claimed is:

1. A translation text inputting apparatus for reading a source text in character string form of expression and a translation text in voice form of expression and converting the translation text to a character string, the apparatus comprising:

a source text analysis and bilingual dictionary retrieval module for predicting at least a translation text word composing the translation text, by identifying at least a source text word which composes the source text and retrieving a bilingual dictionary by use of the identified source text word as a key;

a phoneme recognition module for converting the translation text in voice form to a lattice of phonemes with a recognition probability exceeding a predetermined value; and, a phoneme to character conversion module for converting the lattice of phonemes outputted by said phoneme recognition module to the character string, wherein a path in the lattice is searched, said path matching the phonemic expression of one of the translation text words predicted by said source text analysis and bilingual dictionary retrieval module and said path being converted to the character string of the matched translation text word.

2. A translation text inputting apparatus according to claim 1, further comprising:

a source text display module for displaying at least a part of the source text on a display apparatus;

means for analyzing the part of the displayed source text contained in the source text analysis and bilingual dictionary retrieval module; and, means for converting the translation text from the voice form of expression to the character string using words predicted by analyzing the part contained in the displayed part of the phoneme source text.

3. A translation text inputting apparatus according to claim 2, further comprising:

a module for judging whether the conversion process for the translation text corresponding to the displayed part on said display apparatus is finished; and, means for displaying a subsequent part of the translation text on said display apparatus when said processing is finished.

4. A translation text inputting apparatus according to claim 1, further comprising:

means for displaying a first part of the source text contained in the source text display module in a format different from that of the other remaining parts;

means for analyzing only the first part of the source text contained in the source text analysis module, which is displayed in a format different from that of the other remaining parts; and, means for converting the translation text from the voice form of expression to the character string using candidate words which are words predicted by analyzing the first part contained in the source text displayed in a format different from that of the other remaining parts.

5. A translation text inputting apparatus according to claim 4 further comprising:

a module for judging whether the conversing process for the translation text corresponding to the displayed part on said display apparatus in a format different from that of the other remaining parts is finished; and, means for displaying a subsequent part of the translation text in a format different from that of the other remaining parts when said processing is finished.

6. A translation text inputting apparatus according to claim 1 further comprising:

a candidate word display module for displaying predicted words as candidate words which are predicted by the source text displayed on a display apparatus for the word forming the translation text.

7. A translation text inputting apparatus according to claim 1, further comprising:

a translation text display module for displaying the translation text by the character string which is an output of said phoneme to character conversion module on a display apparatus.

8. A translation text inputting apparatus for inputting phonograms of at least one of a kana and romaji form of expression, and converting the at least one kana and romaji phonogram to a kanji and kana character string in a second form of expression, said phonograms being in said translation text which includes at least a word translated from a source text, the apparatus comprising:

means for inputting translation text phonograms of at least one of kana and romaji;

a source text analysis and bilingual dictionary retrieval module for predicting at least a translation text word composing the translation text, by identifying at least a source text word which composes the source text and retrieving a bilingual dictionary by use of the identified source text word as a key;

a phoneme recognition module for converting the inputted translation text phonograms to a lattice of phonemes with recognition probability exceeding a predetermined value; and, a phoneme to character conversion module for converting the lattice of phonemes outputted by said phoneme recognition module to a character string, wherein a path in the lattice is searched, said path matching the phonemic expression of one of the translation text words predicted by said source text analysis and bilingual dictionary retrieval module and said path being converted to the second form of expression of the matched translation text word.

9. A translation text inputting apparatus according to claim 8, further comprising:

a source text display module for displaying at least a part of the source text on a display apparatus;

means for analyzing the part of the displayed source text contained in the source text analysis and bilingual dictionary retrieval module, which is displayed on the display apparatus; and, means for converting the translation text from the phonograms to the kanji and kana character string, using words predicted by analyzing the displayed part of the source text.

10. A translation text inputting apparatus according to claim 9 further comprising:

a module for judging whether the conversion process for the translation text corresponding to the displayed part on said display apparatus is finished; and, means for displaying a subsequent part of the translation text on said display apparatus when said processing is finished.

11. A translation text inputting apparatus according to claim 8, further comprising:

means for displaying a first part of the source text contained in the source text display module in a format different from that of the other remaining parts;

means for analyzing only the first part of the source text contained in the source text analysis module, which is displayed in a format different from that of the other remaining parts; and, means for converting the translation text from the phonograms to the kanji and kana character string, using candidate words which are predicted by analyzing the first part contained in the source text displayed in a format different from that of the other remaining parts.

12. A translation text inputting apparatus according to claim 11 further comprising:

a module for judging whether the conversion process for the translation text corresponding to the displayed part on said display apparatus in a format different from that of the other remaining parts is finished; and, means for displaying a subsequent part of the translation text in a format different from that of the other remaining parts when said processing is finished.

13. A translation text inputting apparatus according to claim 8 further comprising:

a candidate word display module for displaying predicted words as candidate words which are predicted by the source text displayed on a display apparatus, for the word forming the translation text.

14. A translation text inputting apparatus according to claim 8, further comprising:

a translation text display module for displaying the translation text by the kanji and kana character string outputted from the phoneme to character conversion module on a display apparatus.

15. A translation text inputting method in an apparatus for reading translation text in voice which includes at least a word translated from a source text, and for converting it to a character string, the method comprising:

a source text analysis step of predicting at least a translation text word composing the translation text, by identifying at least a source text word which composes the source text and retrieving a bilingual dictionary by use of the identified source text word as a key;

a phoneme recognition step of converting the translation text in voice to a lattice of phonemes with a recognition probability exceeding a predetermined value; and, a phoneme to character conversion step of converting the lattice of phonemes outputted by said phoneme recognition module to the character string, wherein a path in the lattice is searched, said path matching the phonemic expression of one of the translation text words predicted by said source text analysis and bilingual dictionary retrieval module and said path being converted to the character string of the matched translation text word.

16. A translation text inputting method in an apparatus for inputting phonograms of at least one of kana and romaji forms of expression and converting the inputted phonograms to a kanji and kana character string in a second form of expression, said phonograms including at least one word translated from a source text, the method comprising:

a source text analysis step of predicting at least a translation text word composing the translation text, by identifying at least a source text word which composes the source text and retrieving a bilingual dictionary by use of the identified source text word as a key;

a phoneme recognition step of converting the inputted translation text phonograms to a lattice of phonemes with recognition probability exceeding a predetermined value; and, a phoneme to character conversion step of converting the lattice of phonemes outputted by said phoneme recognition module to a character string, wherein a path in the lattice is searched, said path matching the phonemic expression of one of the translation text words predicted by said source text analysis and bilingual dictionary retrieval module and said path being converted to the character string of the matched translation text word.

17. A translation method for converting source language words into target language words in a voice typewriter apparatus including a central processing unit, a display unit, a voice input device and a storage unit storing a source text file, a bilingual dictionary and a translation text file, the method comprising steps of:

retrieving a source language word from the source text file of the voice typewriter apparatus for predicting at least a target language word which corresponds to said first source language word;

displaying the retrieved source language word on the display unit of the voice typewriter apparatus for reference by a human operator of the voice typewriter apparatus;

retrieving, from the bilingual dictionary of the voice typewriter apparatus, a set of target language candidate words corresponding in meaning to the retrieved source language word;

with the voice input device, generating a voice input signal of the human operator uttering a target language word corresponding in meaning to said displayed source language word;

converting the voice input signal to a plurality of target language phonetic strings; and, when at least one of the plurality of target language phonetic strings matches at least one target language word among said set of target language candidate words, writing said at least one target language word to the translation text file as a translation of the source language word.

18. The translation method according to claim 17 wherein the step of retrieving the set of target language candidate words from the bilingual dictionary includes retrieving a plurality of target language words corresponding to a range of meanings of said source language word as said set of target language candidate words.

19. The translation method according to claim 17 wherein the step of retrieving the source language word from the source text file includes:

morphologically analyzing a portion of the source text file to recognize at least one source language word comprising the source text file with reference to a dictionary in the source language 20. The translation method according to claim 17 wherein the step of converting the voice input signal includes:

segmenting and extracting a plurality of phonetic features from said voice input signal; and, associating each of the extracted phonetic features with a phonogram.

21. The translation method according to claim 20 wherein the step of converting includes:

constructing a lattice of phonograms which includes a plurality of phonogram strings of the associated phonogram; and, converting one of the phonogram strings into a character expression of the target language word among said set of target language candidate words.

22. The translation method according to claim 21 further comprising:

converting a second one of the phonogram strings into a second character expression of a second target language word among the entire vocabulary of the target language by referring to a target language dictionary of the voice typewriter apparatus.

23. The translation method according to claim 17, further comprising:

displaying the source language word on a first area of the display unit of the voice typewriter apparatus; and, displaying said at least one target language word on a second area of the display unit of the voice typewriter apparatus.

24. A translation method for converting source language words into target language words in a word processor apparatus including a central processing unit, a display unit, an input device and a storage unit storing a source text file, a bilingual dictionary and a translation text file, the method comprising the steps of:

retrieving a source language word from the source text file of the word processor apparatus;

displaying the retrieved source language word on the display unit of the word processor apparatus for reference by a human operator of the word processor apparatus;

retrieving, from the bilingual dictionary of the word processor apparatus, a set of target language candidate words corresponding in the meaning to the source language word;

inputting a kana translation text through the input device of the word processor apparatus from the human operator, the kana translation text corresponding in meaning to said displayed source language word;

converting the inputted kana translation text to a plurality of kana-kanji mixed translation text; and, when the at least one of the plurality of kana-kanji mixed translation texts matches at least one target language word among said set of target language candidate words, writing the kana and kanji translation text to the translation text file as a translation of the source language word.

* * * * *